(12) United States Patent
Faiczak et al.

(10) Patent No.: US 11,601,352 B2
(45) Date of Patent: Mar. 7, 2023

(54) SYSTEM AND METHOD FOR PROVIDING A NETWORK TRAFFIC PORTAL

(71) Applicant: Sandvine Corporation, Waterloo (CA)

(72) Inventors: Kenneth Faiczak, Waterloo (CA); Kamakshi Sridhar, Fremont, CA (US); Sheryl Tarnaske, Waterloo (CA); Samuel Cameron Cullen, Windham, NH (US)

(*) Notice: Subject to any disclaimer, the term of this patent is extended or adjusted under 35 U.S.C. 154(b) by 0 days.

(21) Appl. No.: 16/797,499

(22) Filed: Feb. 21, 2020

(65) Prior Publication Data

US 2021/0135964 A1    May 6, 2021

Related U.S. Application Data

(60) Provisional application No. 62/808,555, filed on Feb. 21, 2019.

(51) Int. Cl.

| | |
|---|---|
| *H04L 12/26* | (2006.01) |
| *H04L 12/24* | (2006.01) |
| *H04L 43/065* | (2022.01) |
| *H04L 41/22* | (2022.01) |
| *H04L 43/0817* | (2022.01) |
| *H04L 43/12* | (2022.01) |

(52) U.S. Cl.
CPC ............ *H04L 43/065* (2013.01); *H04L 41/22* (2013.01); *H04L 43/0817* (2013.01); *H04L 43/12* (2013.01)

(58) Field of Classification Search
CPC ... H04L 43/065; H04L 41/22; H04L 43/0817; H04L 43/12
USPC ........................................................ 709/224
See application file for complete search history.

(56) References Cited

U.S. PATENT DOCUMENTS

| | | | |
|---|---|---|---|
| 10,038,611 B1* | 7/2018 | Wu | H04L 41/06 |
| 11,005,860 B1* | 5/2021 | Glyer | H04L 63/1433 |
| 2009/0313562 A1* | 12/2009 | Appleyard | G01D 4/002 |
| | | | 715/764 |
| 2010/0318649 A1* | 12/2010 | Moore | G06Q 30/00 |
| | | | 709/224 |

(Continued)

FOREIGN PATENT DOCUMENTS

| | | |
|---|---|---|
| CA | 3073463 A1 | 8/2020 |
| EP | 3700134 A1 | 8/2020 |

OTHER PUBLICATIONS

Examination Report, Canadian Patent Office, corresponding Canadian Application No. 3073463, dated Jun. 20, 2022.

*Primary Examiner* — Schquita D Goodwin
(74) *Attorney, Agent, or Firm* — Amarok IP Inc.; Neil W. Henderson

(57) ABSTRACT

A method for providing a network portal including: collecting network data for at least one network provider; analyzing the network data; determining a user role of a user accessing the network portal to review the network data; and providing a visualization of the analyzed network data based on the user role of the user accessing the portal. A system for providing a network portal including: a data collection module configured to collect network data for at least one network provider; an analysis module configured to analyze the network data; a user module configured to determine a user role of a user accessing the network portal to review the network data; and a reporting module configured to provide a visualization of the analyzed network data based on the user role of the user accessing the portal.

19 Claims, 30 Drawing Sheets

(56) References Cited

U.S. PATENT DOCUMENTS

| | | | |
|---|---|---|---|
| 2013/0145436 A1 | 6/2013 | Wiley et al. | |
| 2015/0271008 A1* | 9/2015 | Jain | H04L 41/0672 |
| | | | 714/57 |
| 2016/0103887 A1 | 4/2016 | Fletcher et al. | |
| 2016/0173500 A1* | 6/2016 | Sharabi | H04L 63/105 |
| | | | 726/5 |
| 2016/0212171 A1* | 7/2016 | Senanayake | G06F 3/16 |
| 2016/0294870 A1* | 10/2016 | Banerjee | H04L 43/0876 |
| 2016/0330096 A1* | 11/2016 | Johnson | H04L 43/16 |
| 2017/0272336 A1* | 9/2017 | Johnstone | H04L 43/04 |
| 2019/0116504 A1* | 4/2019 | Rusackas | H04L 43/045 |
| 2019/0199605 A1* | 6/2019 | Malboubi | H04L 63/1408 |
| 2019/0312789 A1* | 10/2019 | Asbi | H04L 41/14 |
| 2019/0361918 A1* | 11/2019 | Rogynskyy | H04L 51/234 |
| 2019/0379592 A1* | 12/2019 | Samadi | H04L 43/0882 |
| 2020/0106741 A1* | 4/2020 | Fandli | H04L 43/045 |
| 2020/0128047 A1* | 4/2020 | Biswas | H04L 67/10 |
| 2021/0350468 A1* | 11/2021 | Prevatt | G06Q 40/08 |

* cited by examiner

| Solution Area | Use Case Name |
|---|---|
| QoE KPIs | ScoreCard Analysis |
| Analytics | Network Performance Monitoring and Analysis |
| Network intelligence in context of subscribers, services, devices and plans | Subscriber Service Analysis |
| | Capacity Planning Analysis |
| | User Behavior and Demographic Analysis |
| | Video QoE Analysis |
| | VoIP and VoLTE QoE Analysis |
| | Gaming QoE Analysis |
| | Cyber Threat Analysis |
| Network Optimization | Fair Usage and Congestion Management |
| Leverage network intelligence and automation to contain costs, preserve quality of experience, and improve efficiency | Video Streaming Management |
| | Heavy User Management |
| | Wholesale and Peering Link Management |
| | Carrier-Grade NAT (CGNAT) |
| | Traffic Steering/Diversion |
| | TCP Optimization |
| | Gaming QoE Management |
| | Cyber Threat Management and Mitigation |
| Revenue Generation | Zero-Rating and Application Based Plans |
| Network intelligence to deliver services to meet subscriber intent | Usage-Based Services |
| | Parental Control |
| Revenue Assurance | Interconnect Bypass Fraud |
| Protect your revenue streams from fraud with granular network intelligence | Video and Television Fraud Management |
| | Data Revenue Leakage Management |
| | Data Fraud Management |
| Regulatory Compliance | Regulatory Quality Monitoring |
| Comply with changing network operator regulations with network intelligence-based solutions | Regulatory Voice-over-IP Management |
| | Regulatory Traffic Management |
| | Regulatory Data Retention |
| | Regulatory Quality Monitoring |

Fig. 5

| Phenomena | Use Case |
|---|---|
| QoE KPIs | QoE KPI Analysis |
| Video | Video QoE Analysis |
| Intent focused cross functional view of use cases | Video Streaming Management |
| | Zero-Rating and Application Based Plans |
| | Video and Television Fraud Management |
| | Intent-Based Congestion Management |
| | Automated Churn Prediction and Prevention |
| Gaming | Gaming QoE Analysis |
| Intent focused cross functional view of use cases | Gaming QoE Management |
| | Zero-Rating and Application Based Plans |
| | Intent-Based Congestion Management |
| | Automated Churn Prediction and Prevention |
| Social Sharing | Subscriber Service Analysis |
| Intent focused cross functional view of use cases | Zero-Rating and Application Based Plans |
| | Data Fraud Management |

FIG.6

| Team | Portal User Types |
|---|---|
| Executive | CEO |
| Information focused on providing status for strategic business initiatives facing Network operators today. | CTO |
| | CSIO |
| | CMO |
| | VP Product |
| Sales and Marketing | CMO |
| Monitor subscriber trends and deliver to meet intent. | VP Marketing |
| | Product Marketers |
| | Sales Leadership |
| Network Operations | Network Operations Leadership |
| Monitor trends and manage resources and deliver consistent QoE | Network Operation Center |
| | Service Operations Center |
| | Network Planning |
| Network Engineering | Network Engineers |
| Monitor trends, manage resources and make modifications to deliver consistent QoE | RAN Engineers |
| | RAN Development |
| Revenue Assurance | Revenue Assurance Leadership |
| Monitor and manage fraud in the network. | Fraud Monitoring Teams |
| Retention | Loyalty and Retention |
| Monitor trends and QoE | |
| Support | Level 2 and 3 Customer Support Teams |
| Monitor and investigate QoE | |
| Regulatory | Regulatory Governing Body Officer |
| Monitor and investigate QoE | Operator Regulatory Compliance Officer |

Fig. 7

| Permissions | Portal User Types |
|---|---|
| Notifications | Thresholds notifications managed by authorized portal administrator |
| | Delivery preferences by authorized portal user |
| Settings | Thresholds notifications managed by authorized portal administrator |
| | Delivery preferences by authorized portal user |
| Use Case Access | Managed by authorized portal administrator |
| Subscriber Personal Information | Managed by authorized portal administrator |

SYSTEM AND METHOD FOR PROVIDING A NETWORK TRAFFIC PORTAL

FIELD

The present disclosure relates generally to a system and method for monitoring computer network traffic and communicating information about the computer network traffic. More particularly, the present disclosure relates to a system and method for a providing a network traffic portal.

BACKGROUND

Internet Service Providers (ISPs) and other network operators are generally looking for intelligent ways to efficiently manage their network traffic in a more granular fashion. For example, ISPs are attempting to balance higher bandwidth demands with limited operating budgets while improving subscriber quality of experience. As more subscribers access greater levels of content online, ISPs are frequently required to balance various demands to ensure subscribers' needs are being met. It is often difficult to monitor the performance and operation of the network and receive appropriate analytics that would allow the network operator to make informed network planning decisions. It is, therefore, desirable to provide an improved method and system for monitoring network traffic and communicating information regarding the network traffic, for example, by providing a network traffic portal.

The above information is presented as background information only to assist with an understanding of the present disclosure. No determination has been made, and no assertion is made, as to whether any of the above might be applicable as prior art with regard to the present disclosure.

SUMMARY

In a first aspect, there is provided a method for providing a network portal, the method including: collecting network data for at least one network provider; analyzing the network data; determining a user role of a user accessing the network portal to review the network data; and providing a visualization of the analyzed network data based on the user role of the user accessing the portal.

In some cases, the network data may include: network traffic flow data selected from the group including: Quality of Service data, composition of network traffic, services, Quality of Experience, and network congestion; and network subscriber data selected from the group including: subscriber device type, subscriber plan, and subscriber traffic flow.

In some cases, the method may further include determining network performance based on the analyzed network data; and providing a traffic action to the network based on the network performance.

In some cases, traffic action may be reprioritizing at least some of the network traffic.

In some cases, the traffic action may include notifying at least one user of the network portal of the network performance.

In some cases, at least some of the analyzed network data may be hidden from a user based on the user's role.

In some cases, the method may further include: presenting traffic actions available to the user based on the analyzed network data and the user's role.

In some cases, the visualization may provide the user an ability to view further levels of granularity with respect to the analyzed network data.

In some cases, the visualization may be customized by the user.

In another aspect, there is provided a system for providing a network portal, the system including: a data collection module configured to collect network data for at least one network provider; an analysis module configured to analyze the network data; a user module configured to determine a user role of a user accessing the network portal to review the network data; and a reporting module configured to provide a visualization of the analyzed network data based on the user role of the user accessing the portal.

In some cases, the network data may include: network traffic flow data selected from the group comprising: Quality of Service data, composition of network traffic, services, Quality of Experience, and network congestion; and network subscriber data selected from the group comprising: subscriber device type, subscriber plan, and subscriber traffic flow.

In some cases, the analysis module may be configured to determine network performance based on the analyzed network data; and a traffic action module is configured to provide a traffic action to the network based on the network performance.

In some cases, the traffic action may include reprioritizing at least some of the network traffic.

In some cases, the traffic action may include notifying at least one user of the network portal of the network performance.

In some cases, at least some of the analyzed network data may be hidden from a user based on the user's role.

In some cases, the system may further include a traffic action module configured to present traffic actions available to the user based on the analyzed network data and the user's role.

In some cases, the visualization may provide the user an ability to view further levels of granularity with respect to the analyzed network data.

In some cases, the visualization may be customized by the user.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

FIG. 5 is a table illustrating a relationship between solution area and use case for the system for providing a network portal according to an embodiment;

FIG. 6 is a table illustrating a relationship between phenomena and use case;

FIG. 7 is a table illustrating an example of teams and user types according to an example;

FIG. 8 is a table illustrating permissions and portal user types according to a specific example; and FIGS. 9 to 16 illustrate various solution areas visualizations according to a specific example of the system for providing a network portal;

DETAILED DESCRIPTION

Generally, there is provided a system and method for providing a network traffic portal. The system and method provided herein are intended to review various statistics and data points in relation to, for example, Quality of Service (QoS), Quality of Experience (QoE), subscriber traffic flows, network congestions and the like. The system and method are intended to provide analytics about the overall network traffic and each subscriber's traffic. With the analytics reviewed and displayed in a graphic report, the network operator may quickly review updates related to congestions, regulatory compliance, fraud, and the like. Embodiments of the system and method may further provide for traffic actions or suggest traffic actions to the network provider via the network portal. The traffic actions are intended to provide an increase in QoS or QoE, reduce network congestion, provide for upgrades or other actions intended to help improve the service provide by the network operator.

Generally, there is provided a method and system for providing a network traffic portal that includes gathering network traffic data of various kinds and at various levels, organizing and/or aggregating the data and presenting the data in various formats, including visual, and at various levels of granularity. The visual representation may include bar graphs, heat maps, and the like.

Figure 1:
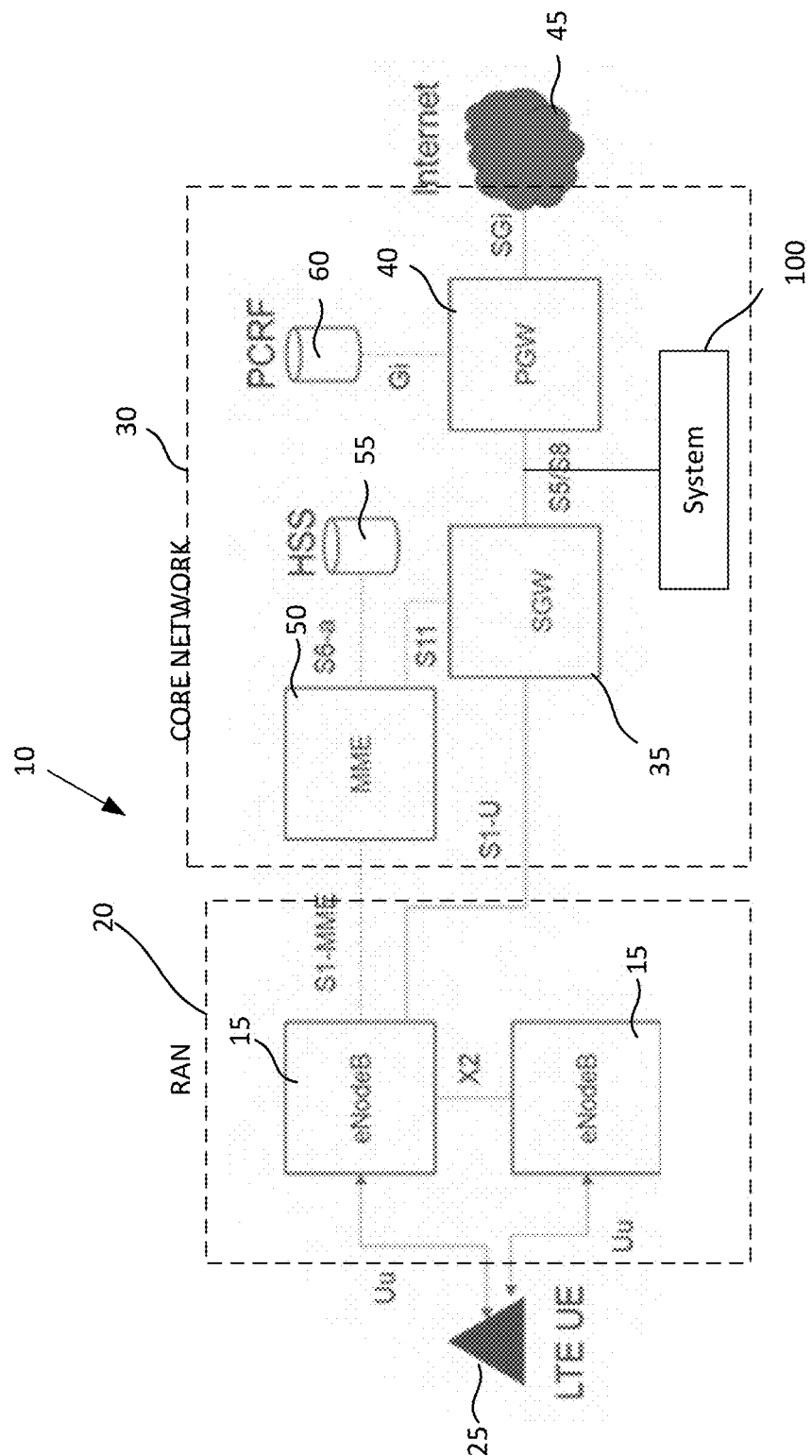
FIG. 1 illustrates an environment for a system for providing a network traffic portal according to an embodiment.

FIG. 1 shows a diagram of an example of a Long Term Evolution (LTE) network 10 architecture. It will be understood that at least one Evolved Node Base station (eNodeB) resides within the LTE Radio Access Network (RAN) 20. The eNodeB is configured to allocate the network resources among the various LTE users 25. The RAN 20 is in communication with the core network 30. The eNodeB 15 connects to the core network 30 via a serving gateway (SGW) 35, which is further in communication with a packet data network gateway (PGW) 40 which is in communication with the Internet 45. The LTE network 10 further includes a Mobility Management entity (MME) 50, which is configured to track the LTE users 25. The MME 50 interacts with a Home Subscriber Server (HSS) database 55 to provide information with respect to the various users 25 of the LTE 10. The LTE 10 includes a Policy and Charging Rules Function (PCRF) 60, which is intended to provide policy control and flow based charging decisions. It will be understood that FIG. 1 illustrates a high level network architecture and that an LTE network may include further aspects not illustrated. The system and method described herein may further be applied to other networks, for example, LTE-A, 3G networks, 4G networks, 5G networks, Satellite networks, mobile networks or other networks.

A system 100 for providing a network portal is intended to reside in the core network 30. In particular, the system 100 may be an inline probe north of the PGW 40, between the SGW 35 and PGW 40, or in another location where the system is able to access the data noted herein. It will be understood that in some cases the system may be a physical network device, or may be a virtual network device. In some cases, the system 100 may send data to the cloud to be processed or the system may process the data internally. One of skill in the art will understand that cloud processing includes processing by one or more remote processors and use of remote memory to store data during processing.

By conducting qualitative and quantitative analytics of changes in the telecommunications industry and the impact on service provider businesses, it was determined that there was a lack of analytics configured to help service providers understand their networks. In particular, service providers were looking for analytics in the following areas, for example:

Telecommunications industry disruption
Business response to disruption and evolution
Network Operations
Network Engineering
Regulatory Operations
User personas in telecommunications
User experience design Business Operations generally need to be reviewed regularly because more and more essential services are becoming digital, more content providers move into the cloud and user expectations to access service or content from any device continues to grow. The change in consumption, demand, delivery and content ownership are causing a transformation of the telecommunication industry from traditional transformation to a cross-functional dev-ops model.

Intent-based networking and the associated visualization of that activity are intended to provide better operational management and decision making for the cross-functional teams. The intent of the network operator may be considered in the analysis of the data and the subscriber QoE and network QoS. The network provider may wish to ensure a certain level of QoE for certain services and the data collected and analyzed by the system detailed herein is intended to provide the network operator results associated with the intent.

The system and method described herein are intended to provide a single closed-loop platform that provides the features to support both network monitoring and management activity based on contextual insight into user behavior patterns and network response. Navigation may be presented in context to both a portal users chosen view (for example, solution area, phenomena, network elements or the like) and the user's responsibility for the network, for example, business strategy, network operations, or the like.

Access to the portal may be role based controlled which may provide insight to all teams while security access to user identified data or network settings is maintained. Authenticated service identification is intended to provide significant reductions in unidentified traffic, which may provide for greater insight to user intent based on service identification. Further, confirmed service identification at a location level may be provided to identify services congestion at each network layer.

Methods used for providing the network portal are intended to detect user demand and manage network response to deliver services. The system and method may further provide a clear metric for how the end user experience measures up to the user demand and adjustments that can be made.

Network or service providers may have custom visualizations within the network traffic portal. Embodiments of the system and method may benefit from conducted customer and end-user research to understand applicable persuasive patterns. Roles based controls from a network provider may limit access to visualizations with user identified data.

Embodiments of the system and method may provide for a custom look and feel including:

Network User type—Categorization of user behavior on the network

Quality of Service visualization—Summary of service-specific performance in one visualization Quality of Experience visualization—Summary of metrics to evaluate the subscribers experience while using a service on the network.

Key performance indicators—Score, throughput, latency, and packet loss as a single data set Intent—layering user intent over key performance indicators visualization to map the relationships.

Embodiments of the system and method for providing a network portal provide for live and historical visual representations of subscriber demand on the network and network response which is intended to optimize the delivery. The data may be shared in its visual format or used as raw data.

In a modem telecommunications business more teams, from business to engineering, may benefit from on-demand visibility into how the network demand is being managed and met from a single source that provides insight into user intent and not just data without context.

Visualizations provided by the method and system are intended to be representative of activity on the network. The visualizations are designed to provide insight to the subscriber and/or network user intent and network response for different teams in the organization from any device at any device and any time. By understanding purpose, the network operators may be in a better position to respond appropriately to any gaps in a network response to user demand from various departments.

The portal is intended to begin with a visualization of Quality of Experience highlights key performance indicators (KPIs) by for phenomena. Phenomena categories are defined through analysis of deidentified global user activity. From there, the phenomena categories can be expand upon to provide more context to the subscriber activity within the scope of the use case.

In a specific example, Social Sharing is the combination of not only social networking, but also the ecosystem that enables and feeds it. Subscribers download applications that they can use on their devices to edit photos and videos, they take pictures or videos (which may get uploaded to the cloud), edit them (which may have them go to the cloud again), and then post on one or more commonly now a plurality of social network sites or applications. Then subscribers may message others (either on the social messaging app or in a separate one) to tell them to check out what the subscriber just posted. These activities may be identified and grouped in different sub-categories of Social Sharing.

The system and method detailed herein allow network operators to see these patterns as they evolve worldwide. The system and method are intended to be able to spot trends in user behaviors along with service adoption or abandonment that may aid in this behavior.

Network Performance Monitoring and Analysis is intended to deliver a historical as well as a real-time view of how well the network is delivering services and applications. As detailed herein, the system is intended to closely monitor the metrics that allow the system to determine if subscriber expectations are met, from detailed transport measurements to application-aware performance information to scores.

The historical perspective on key network performance quality indicators (for example, throughput, packet loss, and latency) identifies network trends requiring further in-depth investigation. Optional real-time capabilities may enable network operations teams to proactively understand, troubleshoot, and respond to network application issues quickly before users are impacted. In some cases, the system and method may perform automated traffic actions in order to maintain or improve network performance based on the analyzed data.

Gaming QoE Analysis focuses on user activity specific to gaming on the network. With the rise in Cloud gaming more gamer are moving away from game downloads and interactive gaming. These gamers want premium service with low latency and high volume service for the games. A gamer who spends 8+ hour gaming in a week, is most likely to change providers based on high latency that create a poor quality of experience casual mobile gamer might be interested in. The visualization provided by the system is intended to provide a high level summary of user behaviors for business decision makers and drill down into more levels of granularity for more technically detailed portal users. The system may be configured to also notify all teams or certain individuals if there are sudden changes in gaming activity or other network activity.

Regulatory Quality Monitoring is intended to provide transparency for both the regulatory bodies that hold operators accountable to their network performance obligations in that region. Regulatory bodies may be able to receive an overview of various network conditions for each operator, including, for example Quality of Experience (QoE) KPIs. It will be understood that a network operator can only access reports for their own services. Accountable resources may be able to see the same reports the regulatory bodies are monitoring. Operators can receive a notification if services or KPIs are dropping below a regulated thresholds in order to take action to avoid financial repercussions. Operator who have automated services may be able to monitor the regulatory view to verify the regulatory bodies are seeing appropriate results.

The responsive nature of the various visualizations allows for embodiments of the system and method to provide secure access from a broad range of devices. The embodiments of the system and method are intended to provide, for example, insight to network user patterns and the intent for their actions; immediate network response and outcomes of the response; early alarming to behavior or demand that cannot be met; faster decision making as a business based on user or subscriber behavior, and the like.

The system and method may address the need for pockets of data in various formats. Further, the system and method may provide for multiple account access to independent vendor platforms to monitor, manage and market to user demands. The roles based visualizations and dashboards provide insight based on network user intent in the content for various user roles, for example, marketing, network operations, engineering, and the like.

Embodiments of the system and method may use persuasive patterns to visualize intent and network management activity for executive, business and technical users.

Embodiments of the system and method for providing a network traffic portal are designed to visualize outcome-driven use cases for network operators. As operators deploy use cases to solve business problems, the visualization and workflow of the use cases may be exposed within the portal. Analytics may provide a foundation for the system, which may enable operators to improve subscriber experience by applying policies and optimizing the network, based on targeted intelligence. Embodiments of the system and method may help visualize contextual use case information by subscriber, device, service, technology, network access type, and the like. Operators may be able to determine their return on investment (ROI) based on factual, instantly visualized data for the broadest set use cases. In addition, operations teams can configure, visualize, and get performance reporting on various network devices and solution elements.

Embodiments of the system and method for a system and method for a network traffic portal may be optimized for persona-based workflows. Executive summaries may include an overall analytics view on how the network is delivering services to the enterprise and consumer subscriber base. Each use case may have a different visualization that aligns with the business needs of the operator group that has deployed the use case—whether it be engineering, operations, marketing, product management, customer care, information technology, or the like.

Embodiments of the system may include a cloud-based software solution that may allow for a single point of access visualizations of user demand on the network, the network's response to optimize the delivery. Visualizations and workflows may be designed for different user personas across teams within an organization. Secured access controls for sensitive data systems or business critical systems, visualizations from the portal can be shared between teams in the original visual format or as a raw data export.

Figure 2:
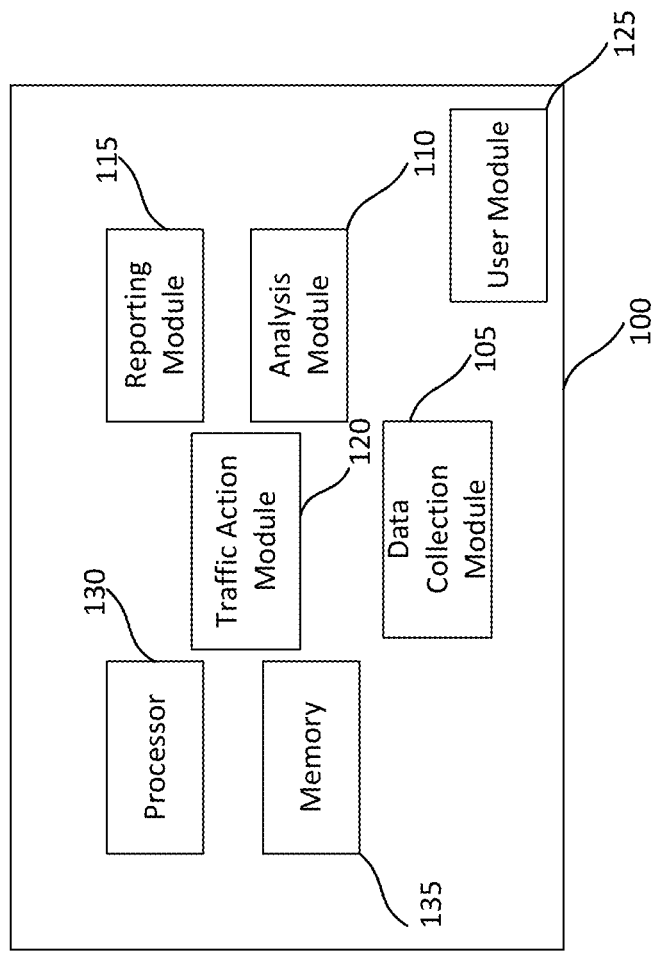
FIG. 2 illustrates a system for providing a network traffic portal according to an embodiment.

FIG. 2 illustrates an embodiment of the system for providing a network traffic portal. The system includes a data collection module 105, an analysis module 110, a reporting module 115, a traffic action module 120, a user module 125, at least one processor 130 and at least one memory component 135. The system 100 is intended to reside on the core network but, as noted, may be remote or access remote resources, while having a connection to the core network. The modules, including the processor 120 and memory 135, are in communication with each other but may be distributed over various network devices or may be housed within a single network device. The system 100 is intended to receive information from the network equipment that allows the system 100 to determine traffic flow criteria, including application type, device characteristics, user quota, time of day, ongoing events and the like per subscriber as well as overall network congestions data. In some cases, the system may determine whether an ongoing event may be affecting the traffic flow, for example, a large congregation of people at a single venue may adversely affect traffic in an associated cell.

The data collection module 105 is configured to monitor traffic of each subscriber on the network and collect data with respect to application use, QoS and QoE aspects. The analysis module 110 is configured to review the data and determine trends and points of interest as detailed herein.

In some cases, the analysis module 110 may include at least one Business Intelligence (BI) platform that may be designed with the need of data scientists and analysts in general. Traditionally, teams may have taken manual steps to merge the data with a disconnected data source then analyze data and share findings. Traditionally, sourcing and consolidating data into a BI platform was a manual collection process across different solutions that may have taken 6-9 months to gather.

Further, in conventional solutions data may also be skewed depending on how it was calculated, aggregated, and/or combined with other data or scrubbed before sharing between teams. Two teams may get different results when working with the same data source, interpret user intent differently or have user demand will change faster than an organization can understand and respond to it.

Conventional solutions relating to network traffic often do not communicate user intent and network response to meet it. These solutions are often focused on detailed visualizations of raw data for network engineering and operations personas and do not present the data in context for the user persona viewing it. Further, in the telecommunications industry, service providers may have a variety of solutions vendors in the network. Each vendor may offer their own set of independent solutions that represent a set of data without providing further insight. These conventional solutions, supplied by each vendor, often operate independently. The complexity of vendor solutions, even within a single vendor portfolio, creates an extra layer of complexity within the services provider in just managing the data to find insights and stay competitive in a changing marketplace.

The user module 125 is intended to determine a role of a particular user of the system 100. In some cases, the memory component may have predefined user roles and on accessing the system, the user module 125 may determine the role of the user based on, for example, log in credentials, access parameters, or the like. The user module 125 may be used to determine the visualizations and reports received by a user. It will be understood that depending on the type of user, data may be displayed differently and certain data may be hidden in order to protect subscriber privacy. In a specific example, a regulatory body user may be able to view specific network information related to a plurality of network operators. A CEO or CFO of a network operator may have a dashboard that includes high level analysis of the network as a whole and a network system operator may have specific visualizations of each component of the network. It is intended that the user module 125 determines the user's role and is able to prepare dashboard and visualizations that may be tailored to the current user.

The reporting module 115 of the system for providing a network portal is configured to report the analyzed data received from the analysis module 110 via, for example the network portal display. In some cases, the reporting module may provide for the display of the data as detailed herein. In other cases, the reporting module 115 may provide reports, alarms or other notifications to an administrator, network system engineer, or other designated user role. In some cases, the reporting module 115 may push an alarm when the analysis module has detected fraud or regulatory compliance issue. In other cases, the reporting module 115 may provide a designated user or administrator of the network operator a banner or badge regarding an issue when the designated user or administrator logs into the network portal.

The traffic action module 120 may provide a designated user, network system engineer, or other user role with a list of traffic actions that may aid in a specific network issue. In some cases, the traffic action module 120 may provide for shaping specific applications in order to improve overall subscriber QoE. In other cases, the traffic action may be to reroute traffic, change a traffic policy, or change priority for certain subscribers or services based on the current network conditions. Still other traffic actions may include upgrading network equipment or providing software updates for particular applications. In still other cases, the traffic action module 120 may provide for the traffic action automatically.

Embodiments of the system and method disclosed herein are intended to create a closed loop single source of insights for solutions on the network and access to insights driven visualizations designed to provide insights to business and engineering personas across the organization. Subscriber experience insights are presented in context of what activities each subscriber is using the network for, while network performance insights are provided by measuring how the network is responding to subscriber demand.

There has been a change in consumption, demand, delivery, and content ownership transformation of telecommunication industry from traditional transformation to a matrix structure with strategic initiatives based on business analytics. In the telecommunications industry, intent-based networking and the associated visualization of that activity may be at the center of better operational management and decision making for the cross-functional teams. This visualization is intended to be addressed in the embodiments of the system and method.

The system is intended to provide for a single closed-loop platform that provides the features to support both network monitoring and management activity based on contextual awareness of subscriber behavior and network access. Secured roles-based access to persona specific dashboards designed to put data into context for that persona type.

In some cases, second stage authentication to restrict access to sensitive subscriber data such as personal identification usage or billing may be provided, by for example, the user module. Further, second stage authentication may restrict access to review of make changed to business-critical systems or policies.

In some cases, executive and business leaders may have access to responsive use case dashboards that communicate current status and performance against strategic initiatives on an as-needed basis.

In some cases, relationship building teams such as marketing, sales or new product development have access to subscriber behavioral trends and related network performance metrics, but may not have access subscriber-specific details or detailed traffics flows data.

In some cases, authorized customer-facing teams may have access to subscriber-specific information, including user categorization, service score, and network scoring to provide the appropriate level of support to the subscribers.

In some cases, network operations and engineering teams may have access to use cases dashboards that related to subscriber demand and network performance. These use cases may include specific performance detail applicable to these personas' area of expertise. Leadership from other teams may have access to an overview dashboard for the use cases but not the drill down or administration tools. A specific subset of these users may have restricted access to make changes to the system, threshold or policies that manage the network.

Navigation within solutions areas and use cases are intended to be contextual to the users' role, permission, and access to a use case or network management features.

Embodiments of the system and method for providing a network traffic portal are intended to organize solution areas and use cases based on various parameters, for example, the Return on Investment (ROI) for strategic initiatives in telecommunications. In some cases, each solution area may have a unique icon and color associated with it. As network traffic and subscriber patterns change, the portal may grow to include further solutions areas and use cases.

Figure 3:
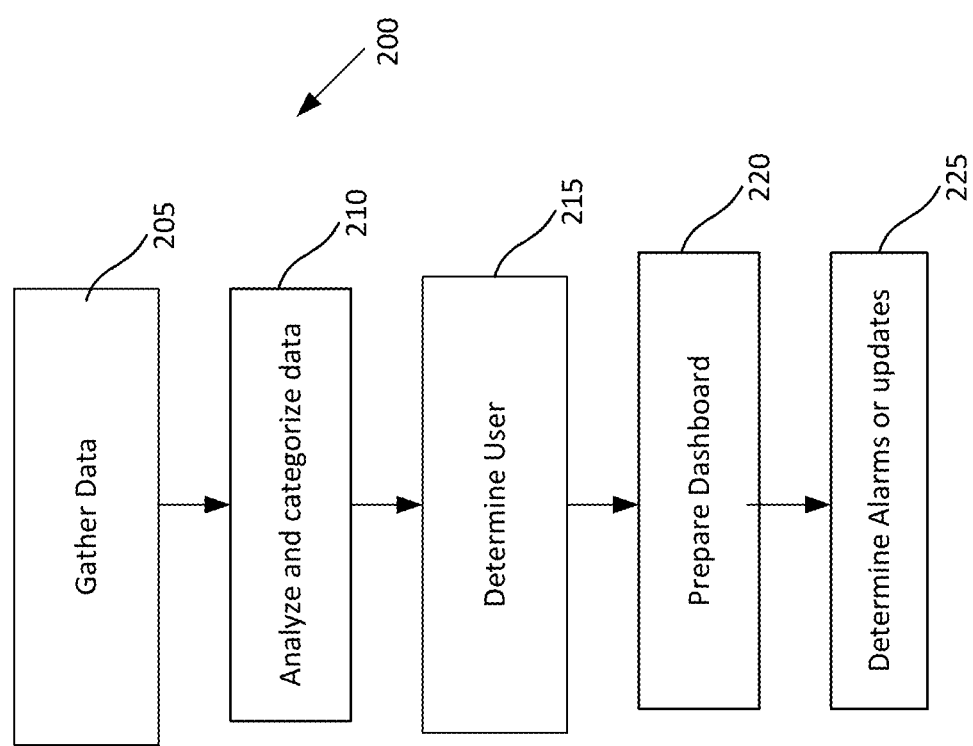
FIG. 3. is a flow chart illustrating a high level method for providing a network traffic portal according to an embodiment.

FIG. 3 is a flow chart of a method 200 for providing a network portal according to an embodiment. At 205, the data collection module 105 collects data associated with the network traffic and subscribers associated with the network traffic. The data may be collected via, for example, deep packet inspection, monitoring traffic flows, subscriber data retrieved from a network provider, or other manner. The data collection module may store the data or have it stored by the memory component of the system.

At 210, the analysis module 110 analyzes the network traffic data. The analysis module 110 may be configured to attribute various traffic flows to various subscribers to determine the services used by the subscriber and the Quality of Experience (QoE) and Quality of Service (QoS) experienced by the subscriber. The analysis module 110 may also aggregate a plurality of subscriber associated data to determine the network performance for various categories or phenomena of the network. The analysis module 110 may anonymize the data where required for privacy reasons and may also determine which users may have access to which data.

At 215, the user module 125 may determine a user accessing the network portal via the system 100. The user module 125 is configured to determine the portal user's role in order to provide appropriate data to the user. In some cases the user module 125 may be in communication with the analysis module 110 to determine which users may access what level of data.

At 220, the reporting module 115 is configured to prepare the dashboard. The reporting module 115 may determine which visualizations are appropriate for the user accessing the network portal. The reporting module 115 may also provide for graphical displays of the analyzed data. In some cases, the reporting module 115 may also send reports or alarms once the data has been analyzed, at 225. The reporting module 115 on determining for example, IPTV fraud, regulatory misalignment, spike in user activity or other issue, may notify an appropriate user or regulatory body via an alarm, for example, an email, a text message, or other form of alarm.

In still other cases, the reporting module 115 on determining an issue may provide for a traffic action to be issued by the traffic action module 120. In some case, the traffic action may be to prioritize a category of traffic, modify the bandwidth allocation, update or modify a policy, or other action which is intended to provide for a better QoE for subscribers amend the traffic priorities in order to meet certain regulatory requirements.

Figure 4:
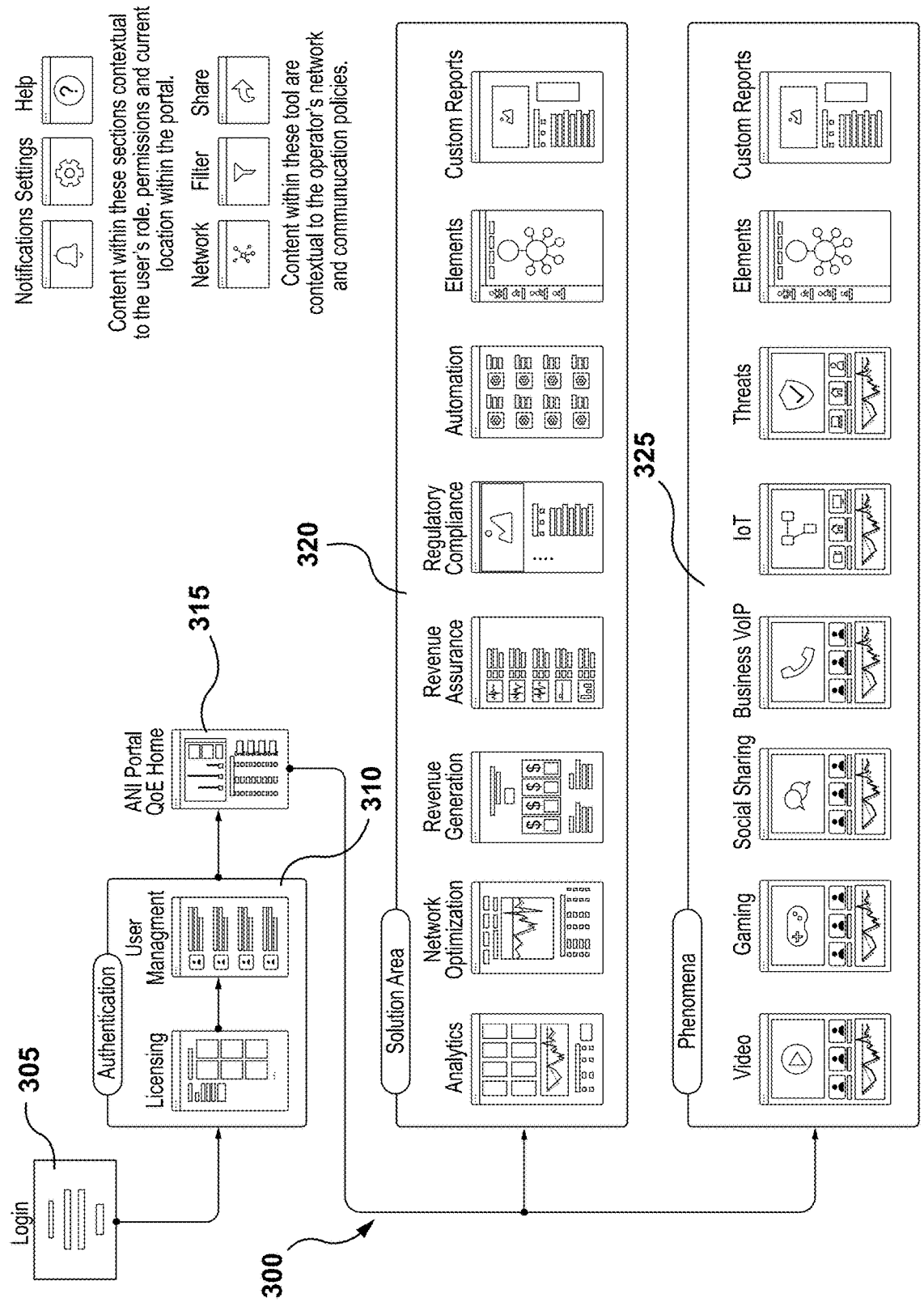
FIG. 4 illustrates a flow chart for the system and method for providing a network traffic portal according to an embodiment.

FIG. 4 illustrates a method 300 for user access to a network portal according to an embodiment. The user logins at 305. The user module may authenticate the user at 310. The system may also determine the visualizations as well as any licensing or user management determined during authentication. At 315, the portal user is provided access to the QoE portal home to review the analyzed network data. The portal user may then navigate between solution areas at 320 and phenomena at 325 as detailed herein. The user is able to accesses various data based on the user role and the analytics provided. At least some of the analyzed network data may be hidden from the user based on the user's role determined at log in. Other data may be only shown in an amalgamated or aggregated form to some users, based on the user role, while other users may have the ability to see further levels of granularity based on the user's role.

Use cases may be a defined set of team activities and tasks. Use cases may have a management overview, and may have progressively more detailed dashboards designed with the context of the user personas for that use case. Not all use cases may be designed for all user personas. In some cases, users may be given permissions to a licensed dashboard by a user recognized within the customer's organization to access it.

FIGS. 5 to 8 are tables illustrating relationships between various use cases and user roles in an example embodiment of the system for providing a network portal. FIG. 5 illustrates solution areas in an example embodiment. The system and method provided herein may provide visualizations in various areas of network operations, for example, analytics, network optimization, revenue generation, revenue assurance, regulatory compliance, automation and the like. Each visualization may have levels of granularity where further details are provided based on the user and the use case.

FIG. 6 is a table illustrating various phenomena or user services according to a specific example. Again, each area may be drilled down or further reviewed to provide a greater level of detail depending on the portal user permissions.

FIG. 7 is a table illustrating various user type and corporation roles of each user type according to a specific example. It would be understood that various networks may refer to their teams in different vernacular and may provide different teams with different access ability.

FIG. 8 is a table illustrating permissions and user roles according to a specific example. It will be understood that the various network operators and regulatory bodies using the system may define user permissions differently.

In some cases, to provide value to team members from login, embodiments of the system and method for providing a network traffic portal are intended to support the ability for each user to set any dashboard as a preferred landing page.

Users can set delivery method, frequency, thresholds for when they want to be notified of network performance based on network activity, subscriber activity, score, intent and other key performance indicators. Administrators can set performance thresholds for network activity, subscriber activity, score, intent, and other key performance indicators. Administrators can set decision parameters for use case and network management actives related to network activity, subscriber activity, score, intent, and other key performance indicators.

In some cases, embodiments of the system and method may include identification of over the top (OTT) service via, for example an operatively connected classification engine which may provide the portal the details of how to identify activity and classify services. The classification engine may also associate user activity with subscribers on the network. The API may result in significant reductions in unidentified traffic and equally significant insight to user intent.

Service identification at a location level may identify congestion at each network layer for the methods to allow for managing network resources to meet the subscriber demand in the context of the intent. The system may further include service health visualizations (sometimes referred to as tiles) which may be a preformatted way of summarizing and visualizing through a network traffic score and other key performance indicators. Depending on the use case, service visualizations may appear in order of organizational priorities, subscriber use, status or the like. The clear display of score and key performance indicators in the visualizations is intended to allow network operators to track the performance of multiple services. The use case and order of the visualizations within the portal may provide context to the severity of any issue. In a specific example, in the Service Operations Center, the service tiles represent the subscriber experience across the network. These services health visualizations may provide SOC team to perform some triage investigation before sending on to another team to resolve. Various teams can refer back to the service visualizations to confirm whether resolution appears to be stable. Because the visualizations are displayed in a meaningful relationship, the SOC team can also quickly check the health of related services and quality of experience is also stable.

In subscriber focused use case, a service visualization might be ordered by top applications used by a specific subscriber. A weak performance visualization at this level may be particular to the subscriber and not reflected up at the network level. The top-level dashboard of the subscriber use case may include a roll-up of the subscriber experience akin to what the SOC may be seeing and provide insight into the subscriber experience specific to the subscriber or a boarder group of subscribers. Providing contextual awareness to the call center or call support team is intended to provide the representative further understanding into how to investigate the issue and escalate where needed.

In each use case, the team may be working from a single source visualization using data from the same closed-loop system and putting the information in the context of the responsibilities of that user persona.

Figure 9:
Figure 10:
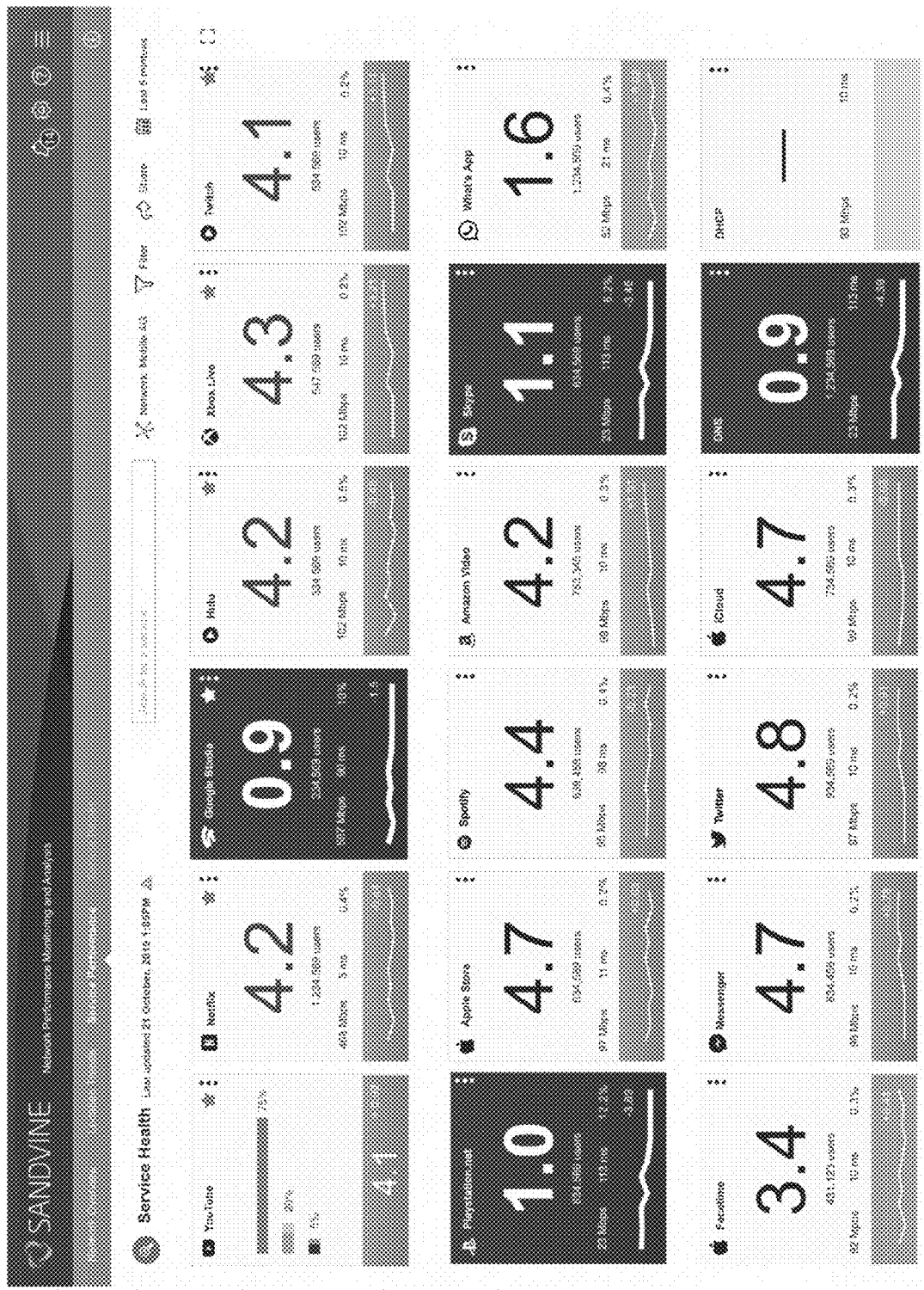
Figure 11:
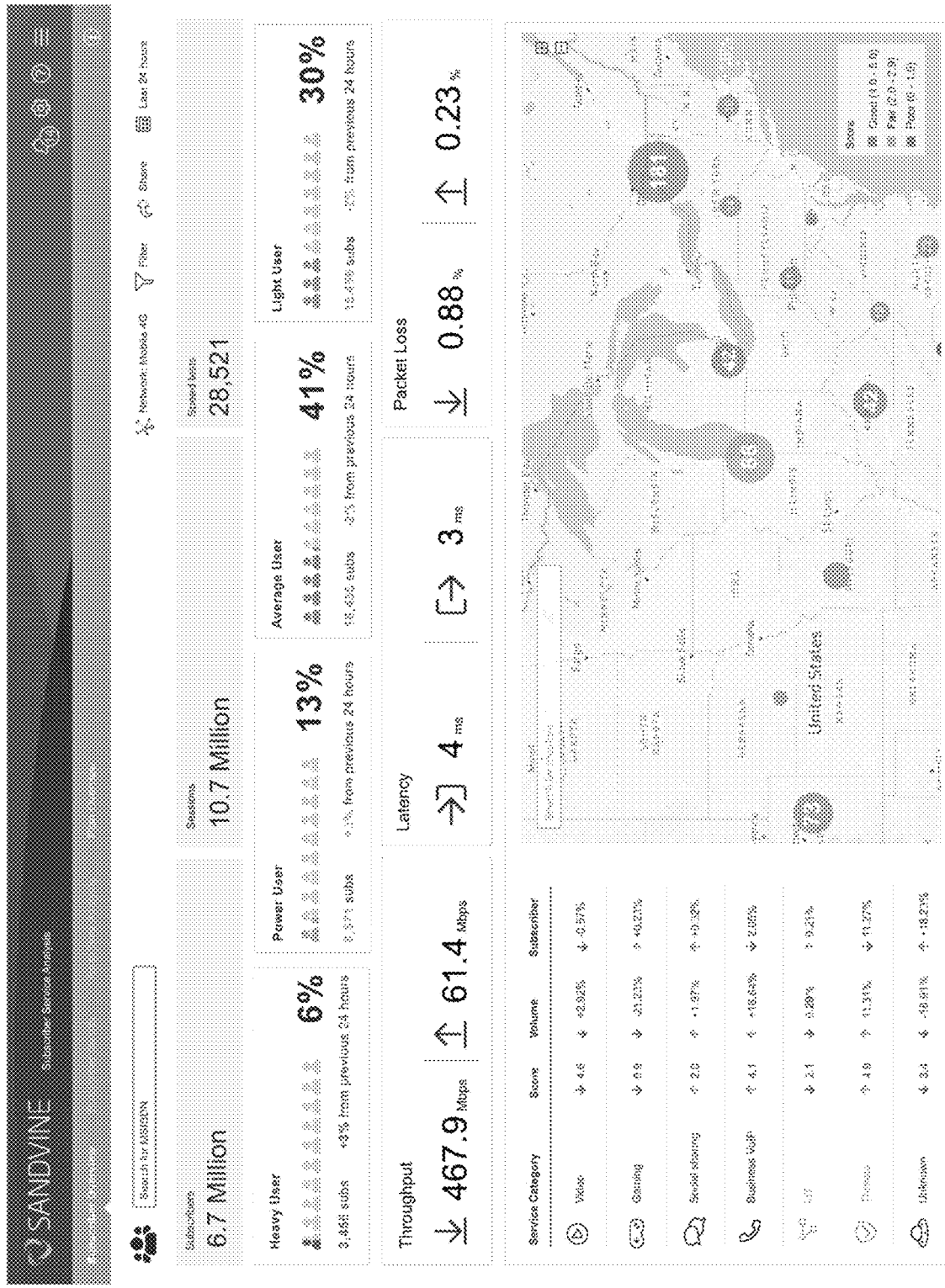
Figure 12:
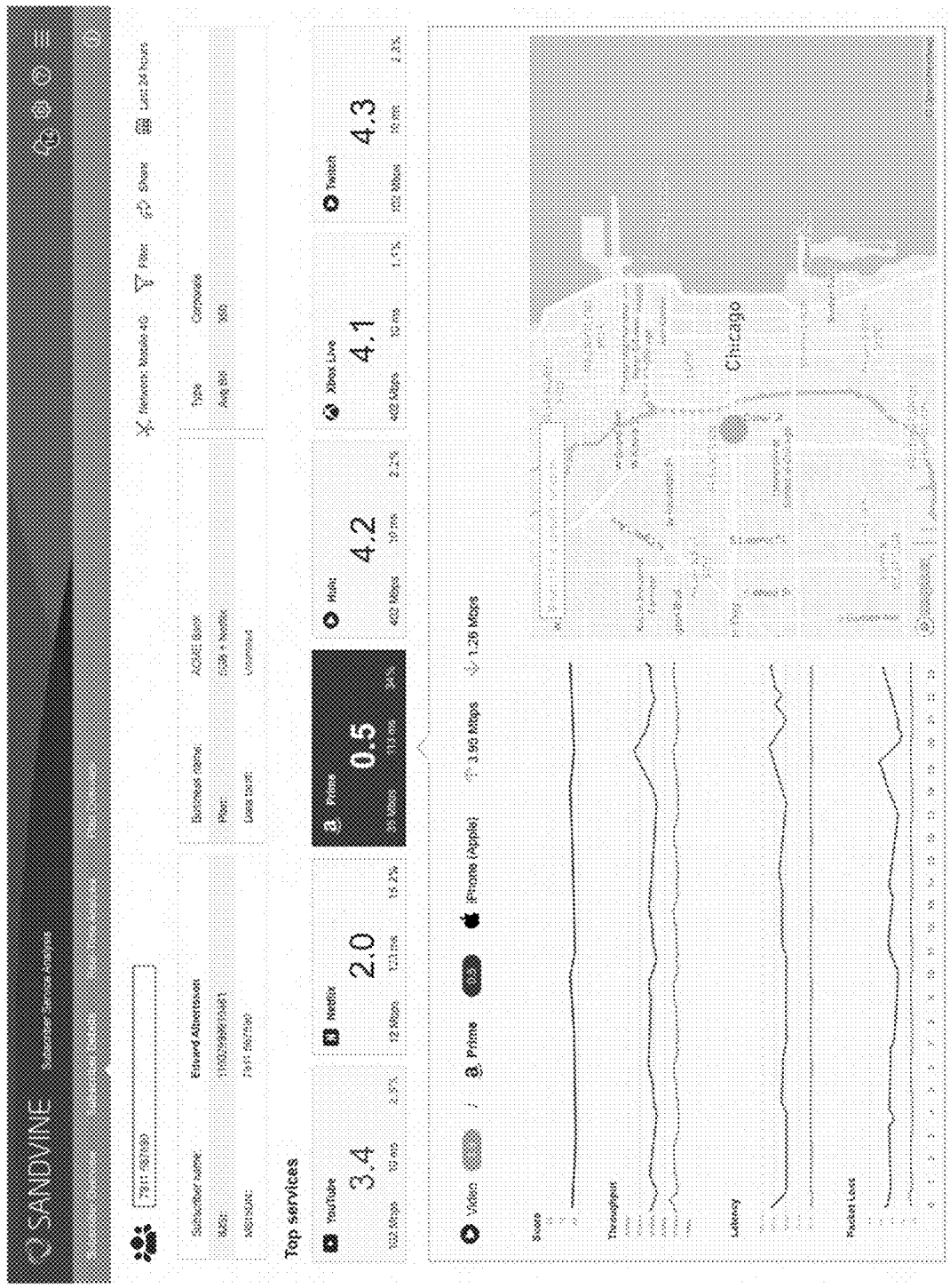

FIGS. 9 to 16 illustrate various solution areas visualizations according to a specific example of the system for providing a network portal. FIG. 9 provides an example visualization of a network overview illustrating the traffic profile and various quality levels for subscribers. FIG. 10 illustrates a visualization showing the service health of various services in the network. FIG. 11 illustrates a visualization of subscriber service performance including latency, throughput and packet-loss the network is currently experiencing. FIG. 12 illustrates a specific example of a subscriber's experience with the network and the Quality of Experience the subscriber is experiencing.

Figure 13:
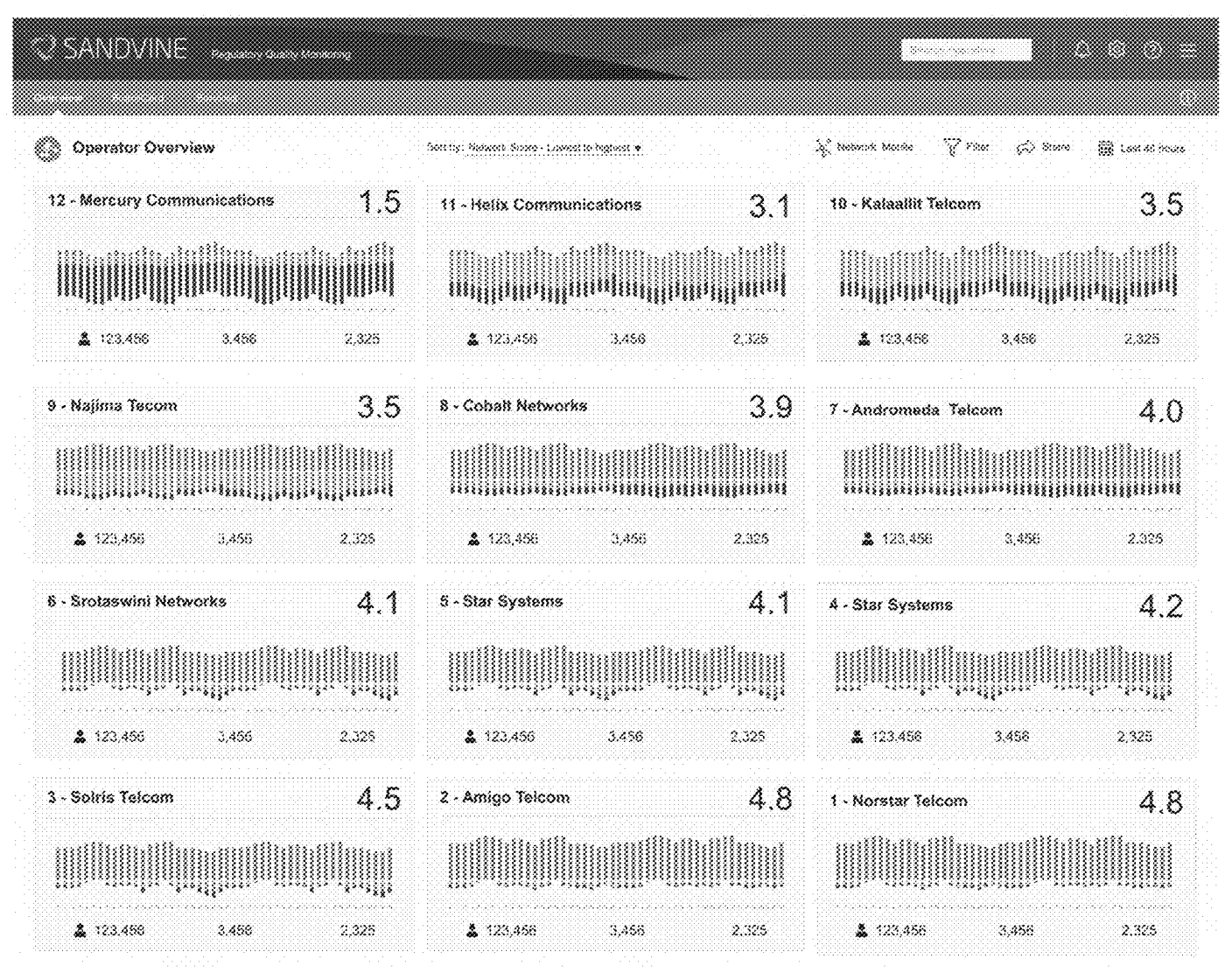
Figure 14:
Figure 15:
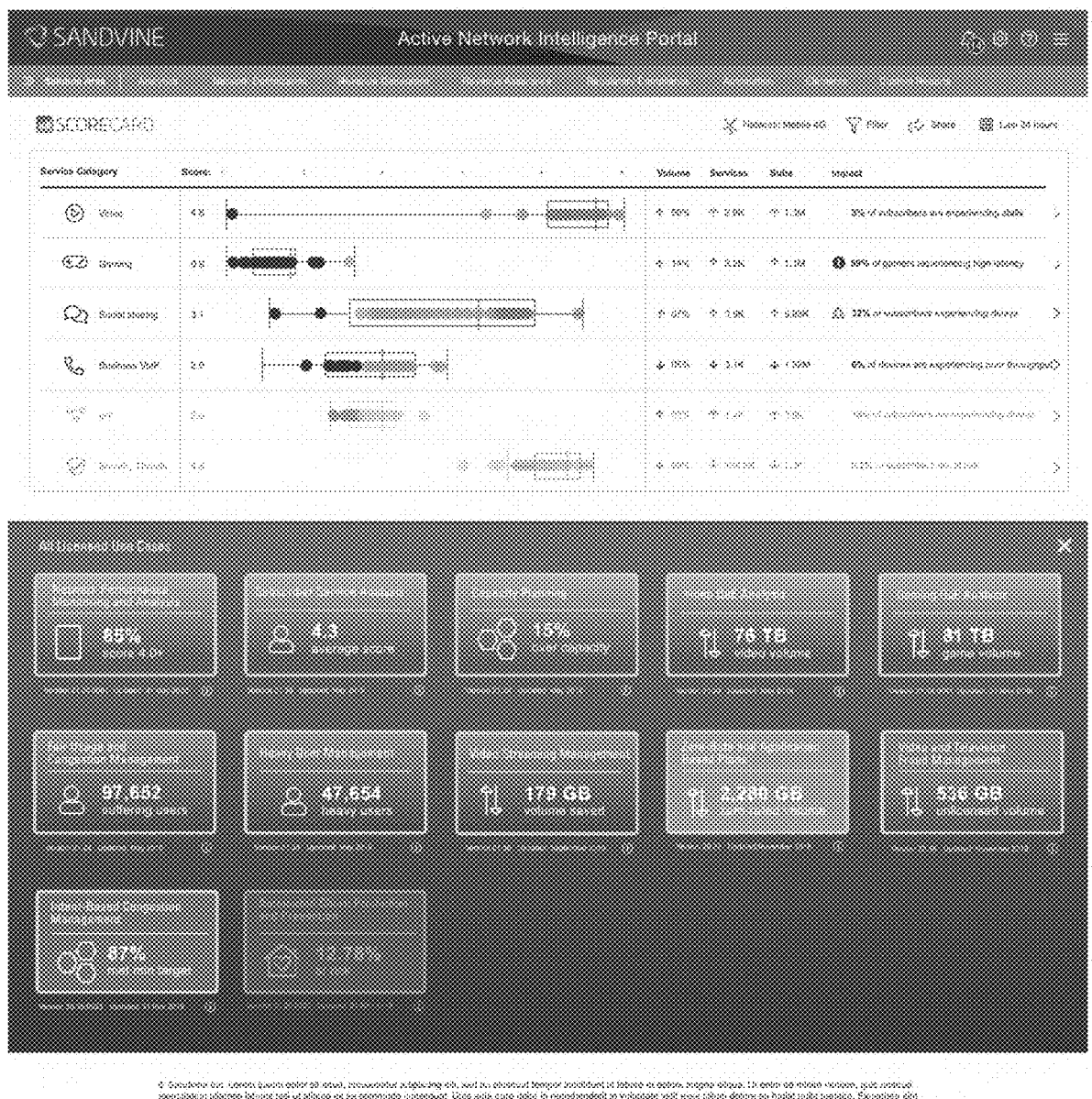
Figure 16:
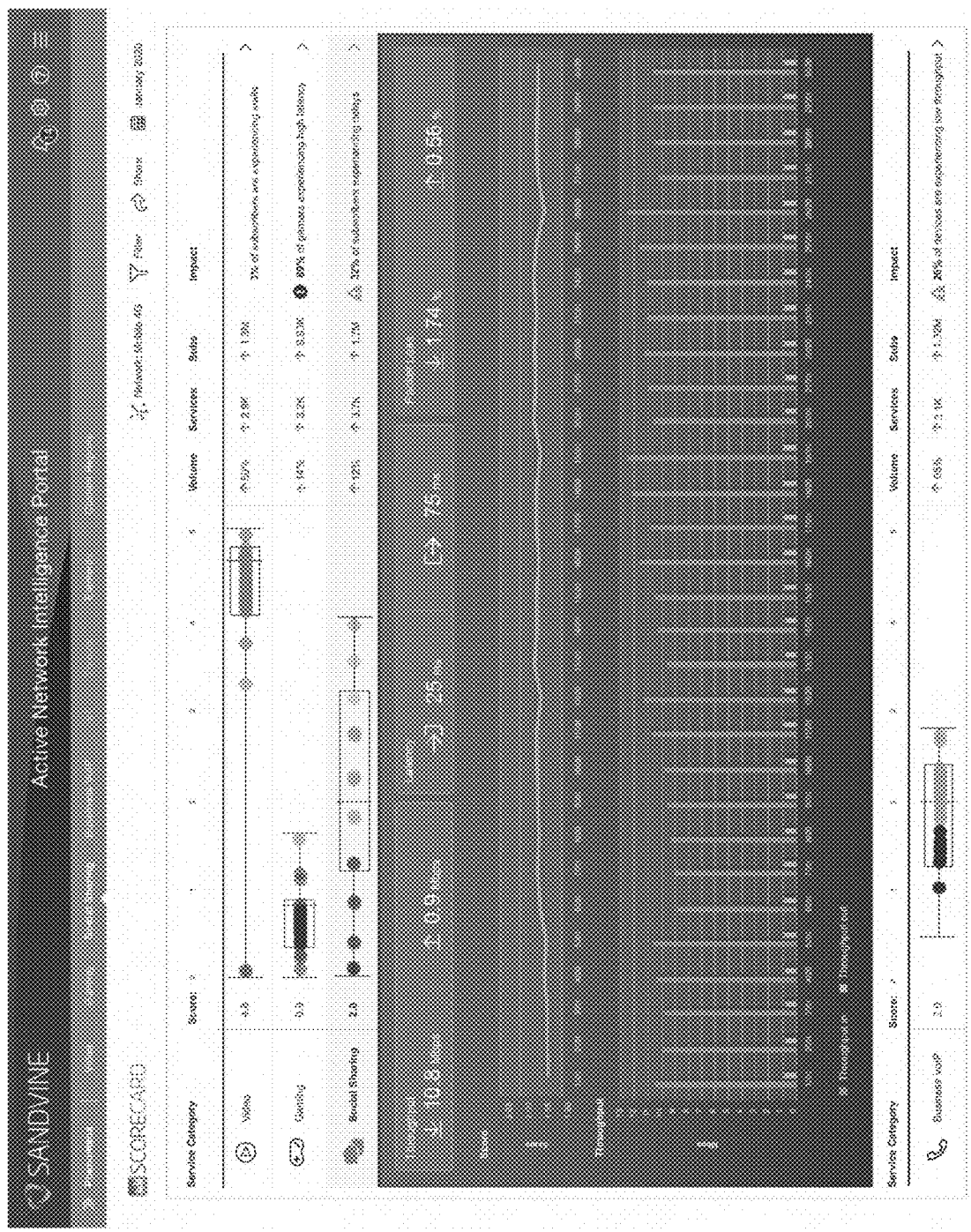

FIG. 13 illustrates a specific example of a regulatory body's view of various networks to determine whether each of a plurality of network operators are achieving their stated quality and intent for their subscribers. FIG. 14 illustrates a specific example of a network operator's view of quality monitoring of various services. FIG. 15 illustrates a specific example of a visualization of a home screen showing QoE KPIs according to a network operator. FIG. 16 illustrates a further level of granularity of QoE KPIs according to a specific example.

Figure 17:
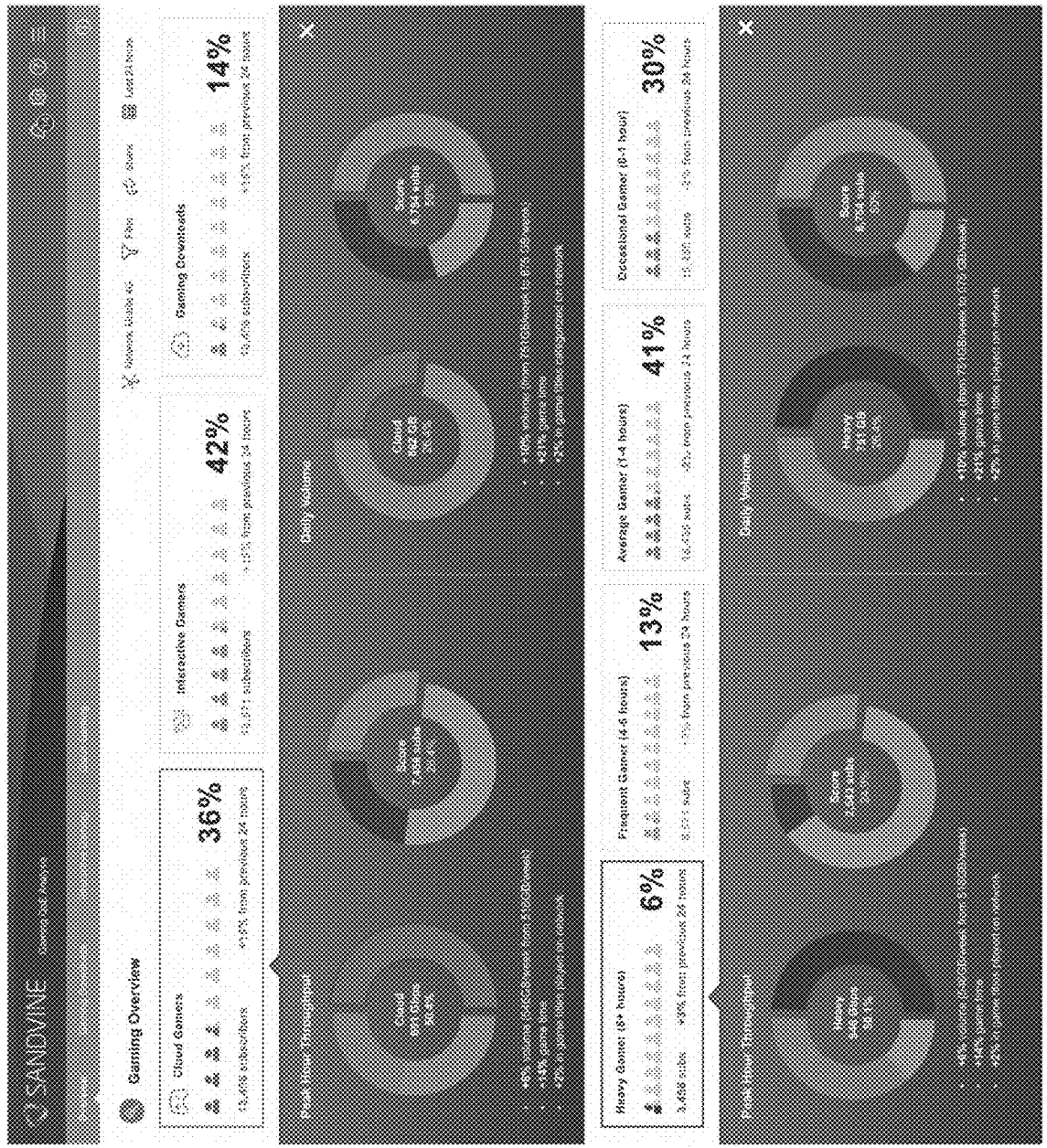
FIGS. 17 to 21 illustrate various phenomena visualizations for gaming services according to a specific example of the system for providing a network portal.
Figure 18:
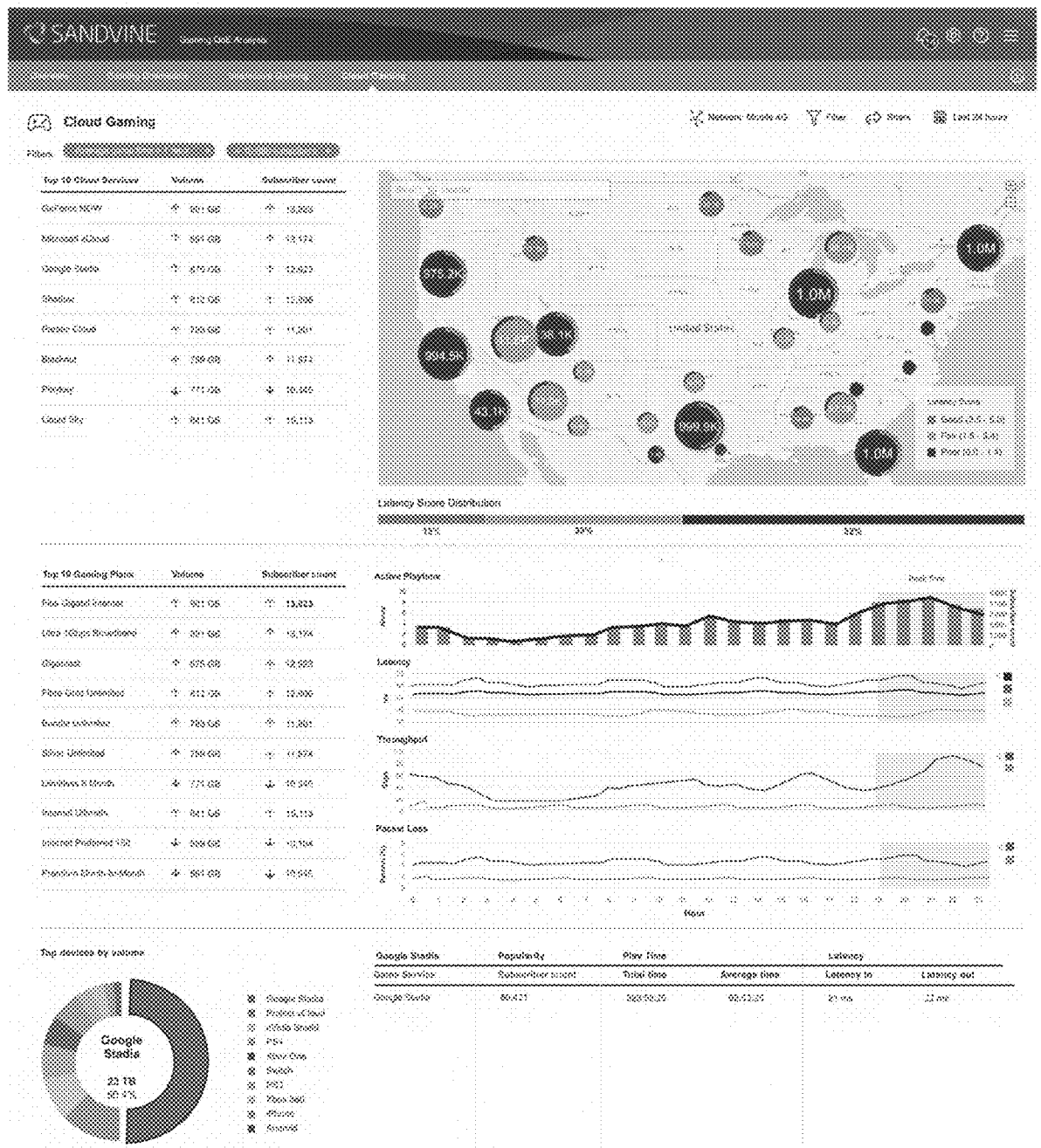
Figure 19:
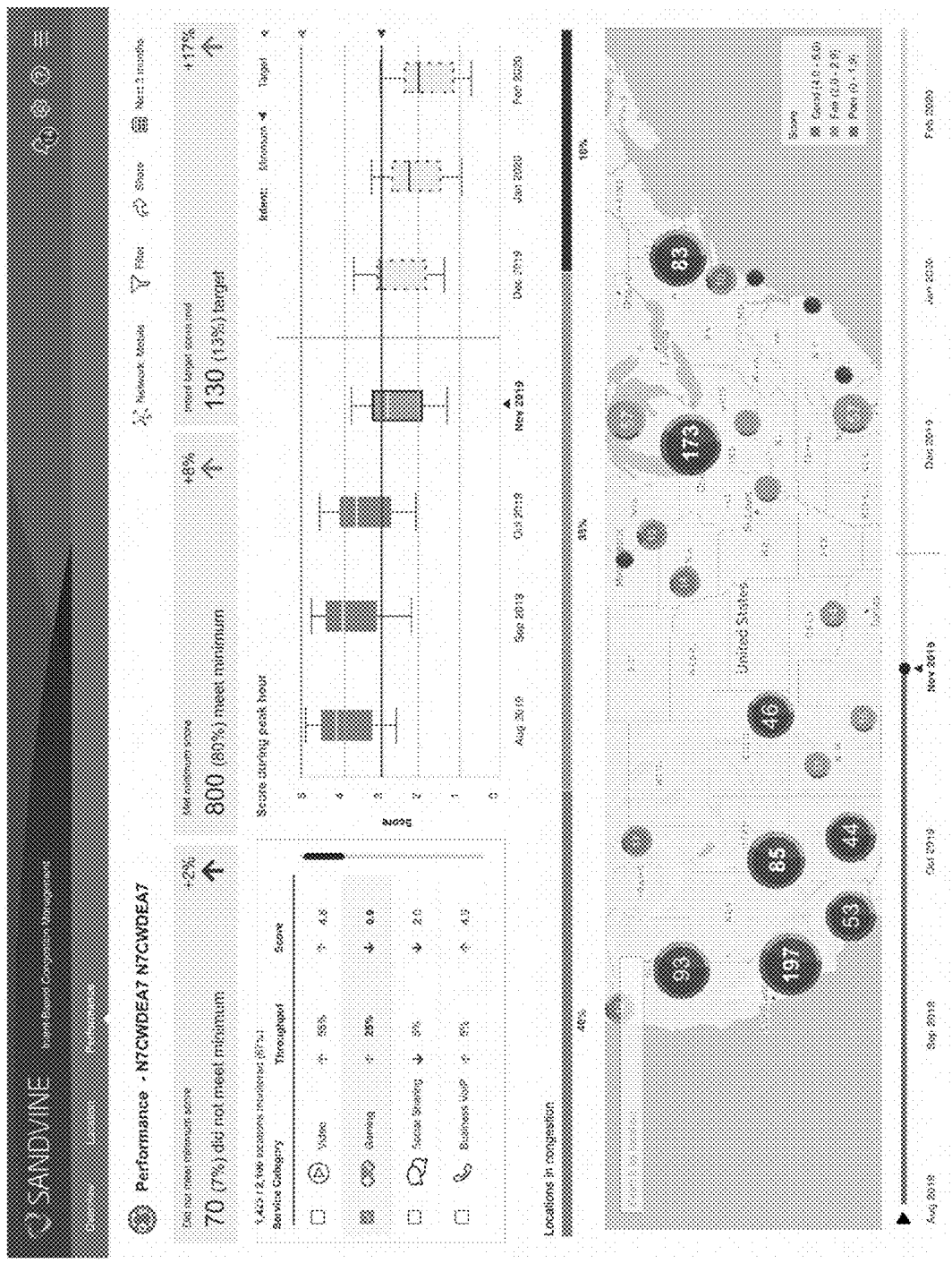
Figure 20:
Figure 21:
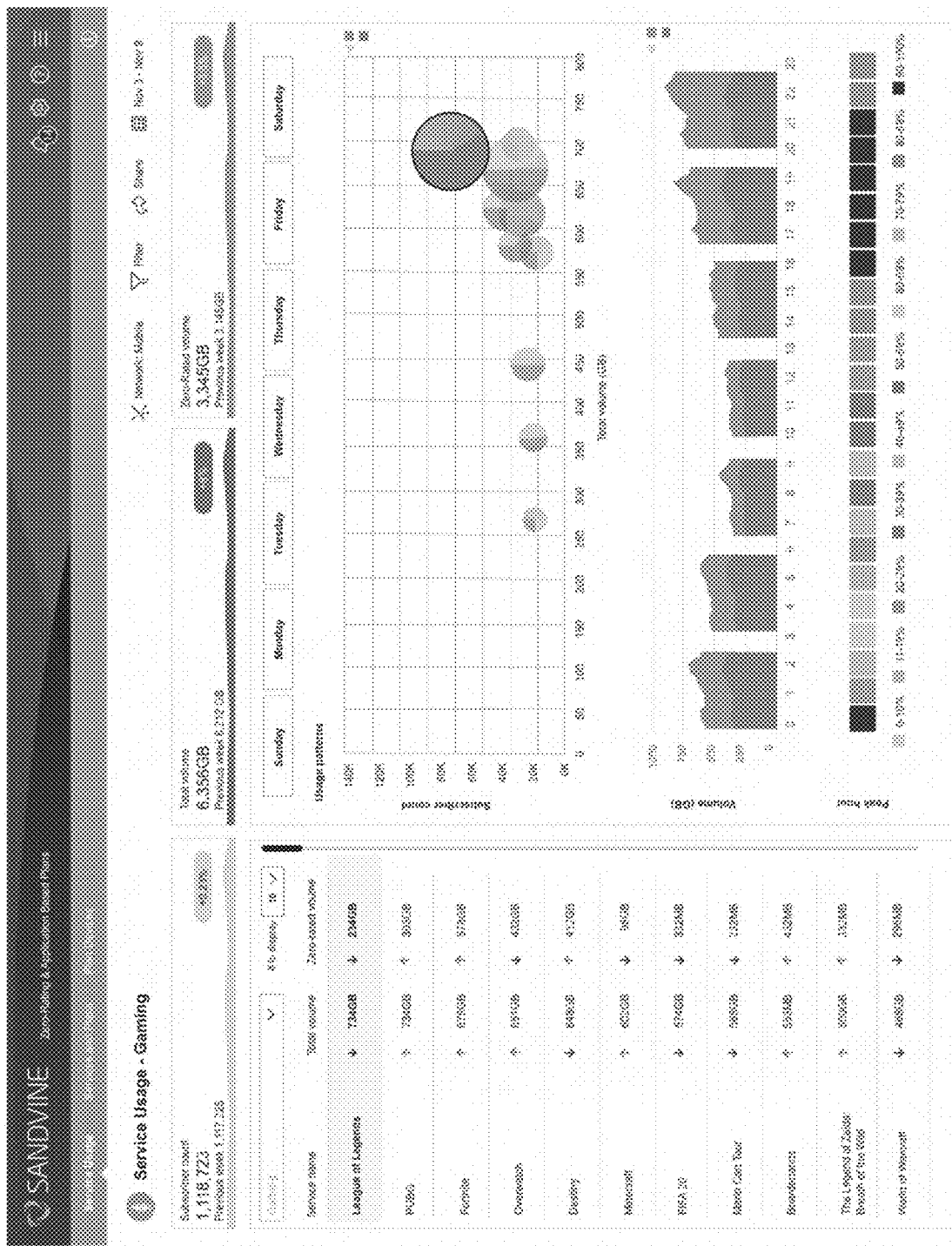

FIGS. 17 to 21 illustrate various phenomena visualizations for gaming services according to a specific example of the system for providing a network portal. FIG. 17 illustrates a specific example visualization showing analytics of a gaming subscribers. FIG. 18 illustrates a specific example visualization showing KPIs associated with cloud gaming. FIG. 19 is a specific example showing intent based shaping associated with gaming services. FIG. 20 is a specific example visualization showing network optimization in association with gaming services. FIG. 21 is a specific example visualization showing revenue generation in relation to gaming services.

Figure 22:
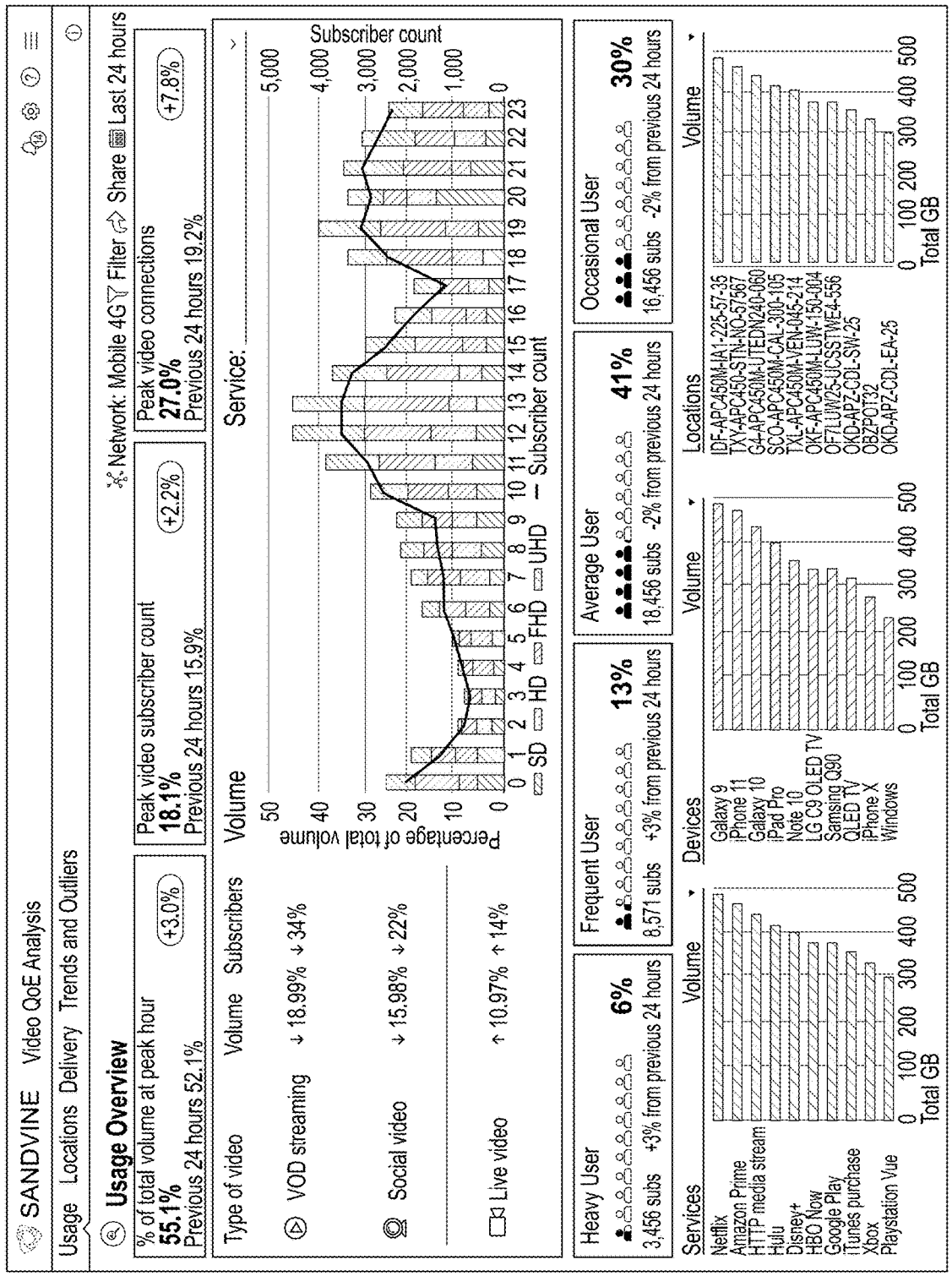
FIGS. 22 to 29 illustrate various phenomena visualizations for video services according to a specific example of the system for providing a network portal.
Figure 23:
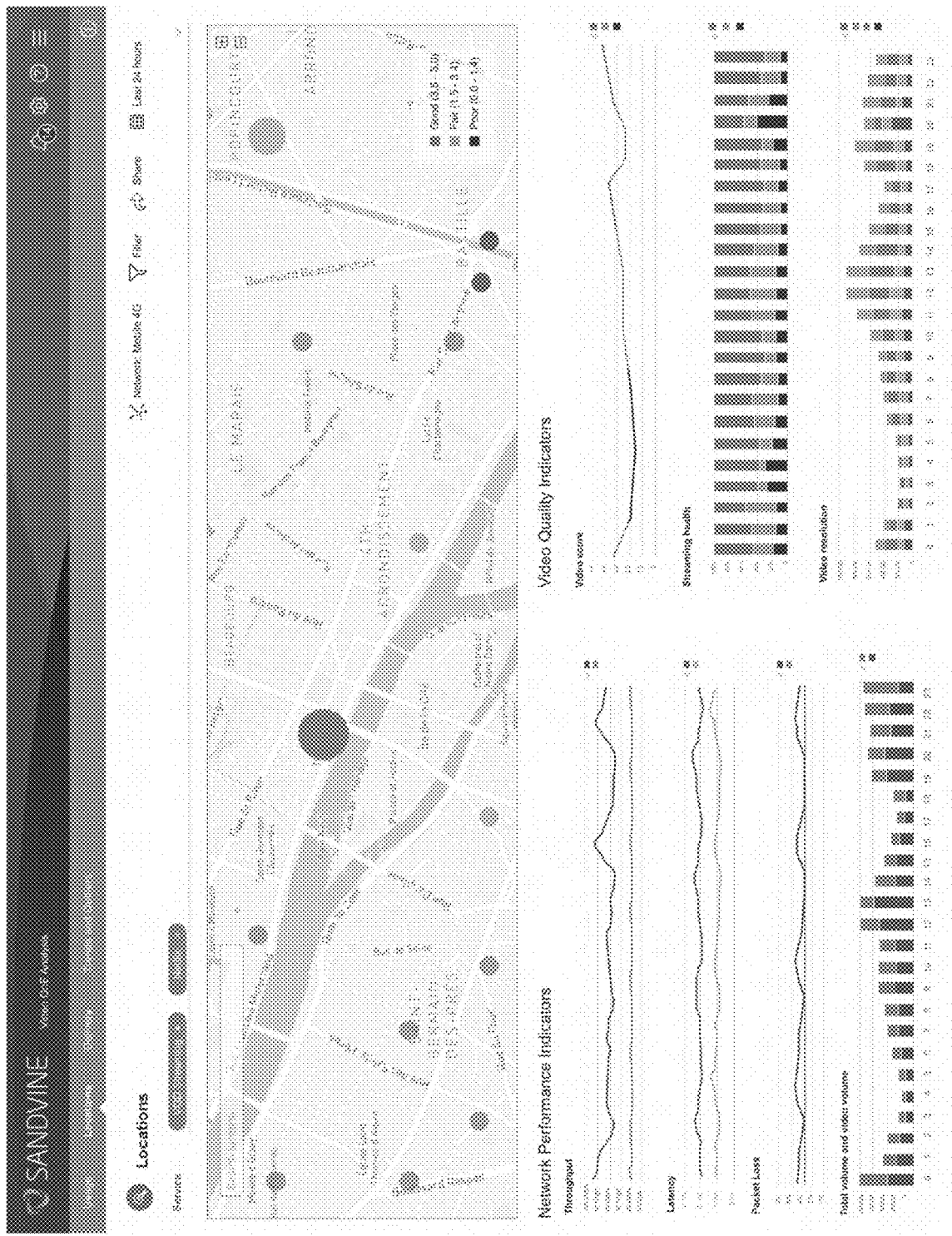
Figure 24:
Figure 25:
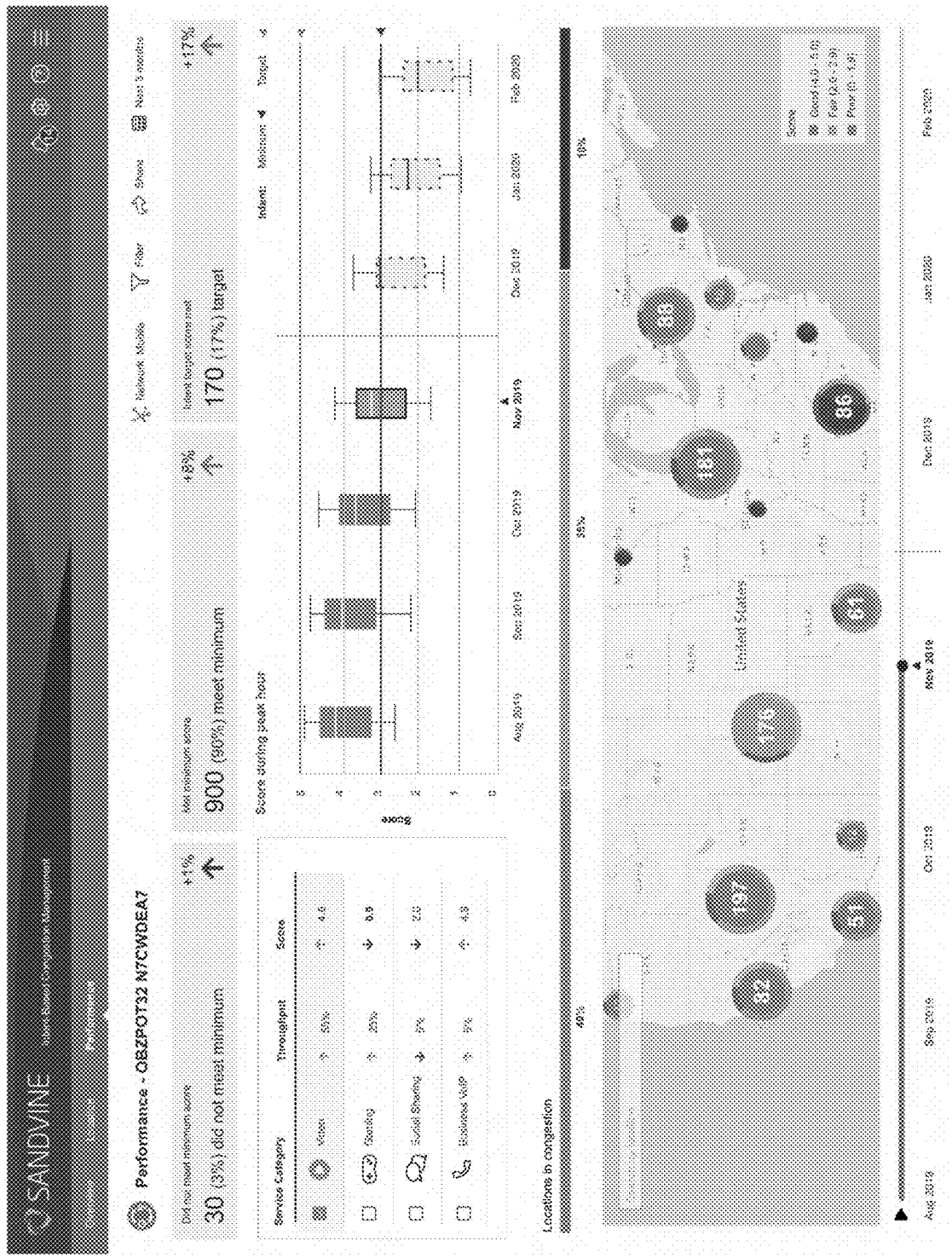
Figure 26:
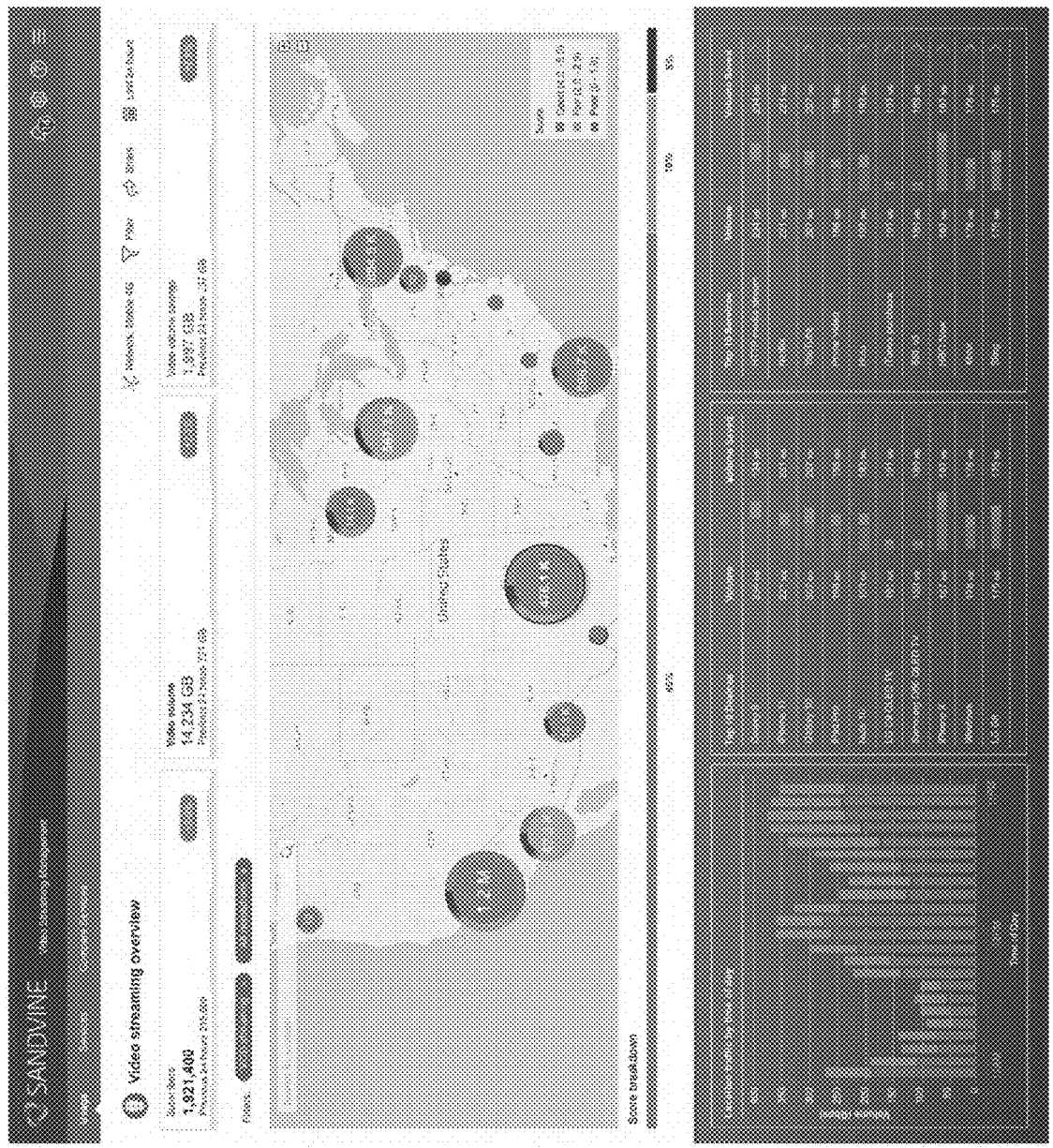
Figure 27:
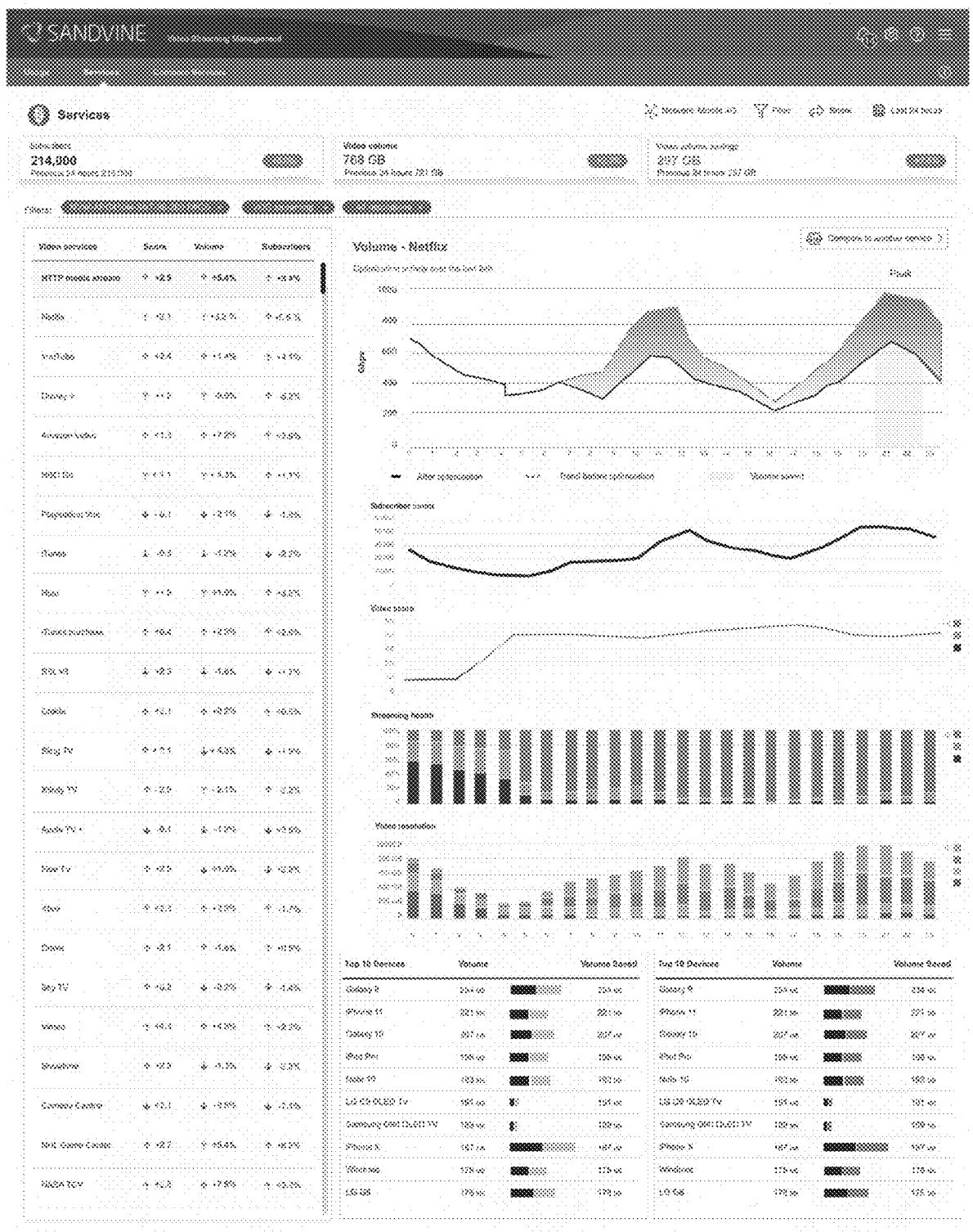
Figure 28:
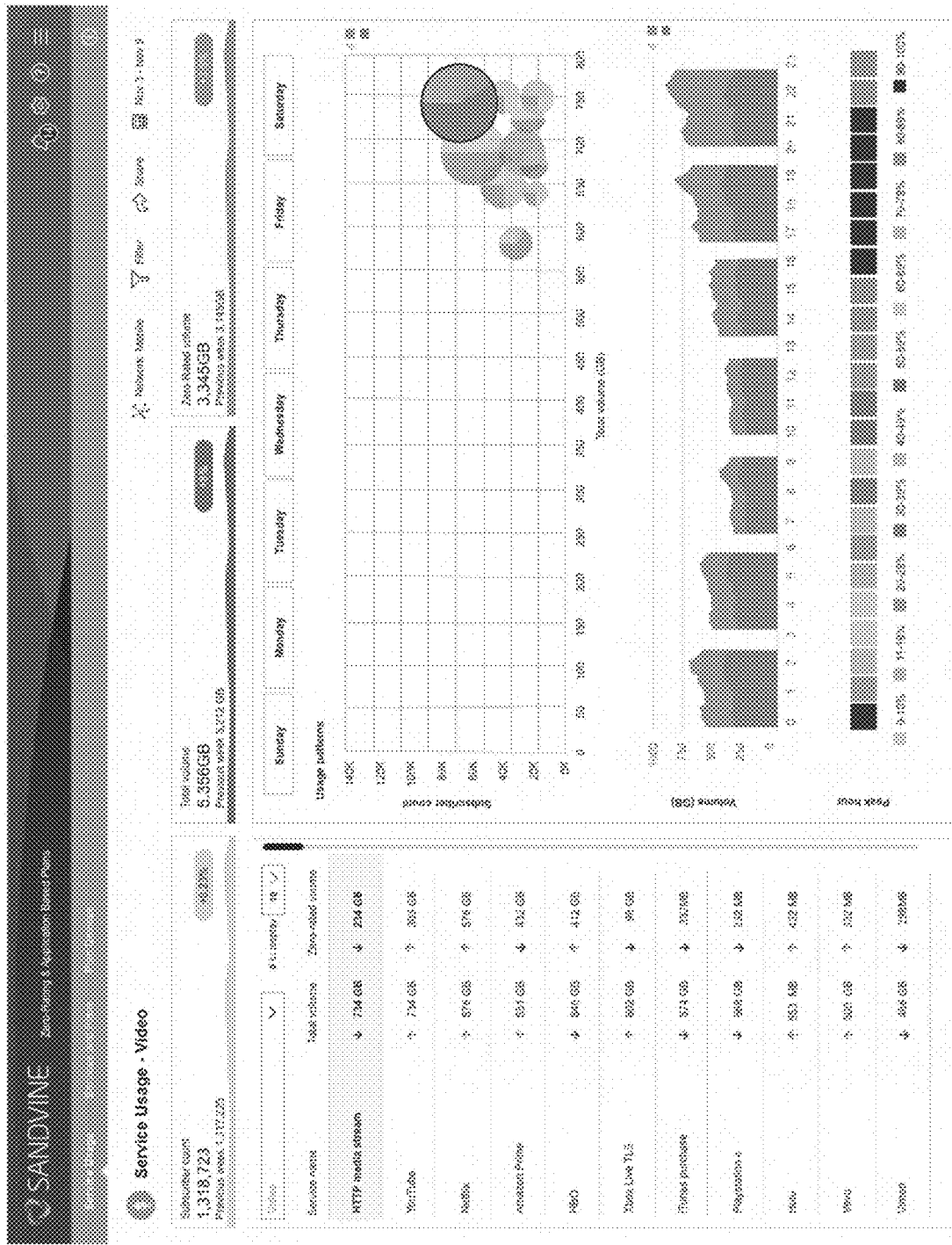
Figure 29:
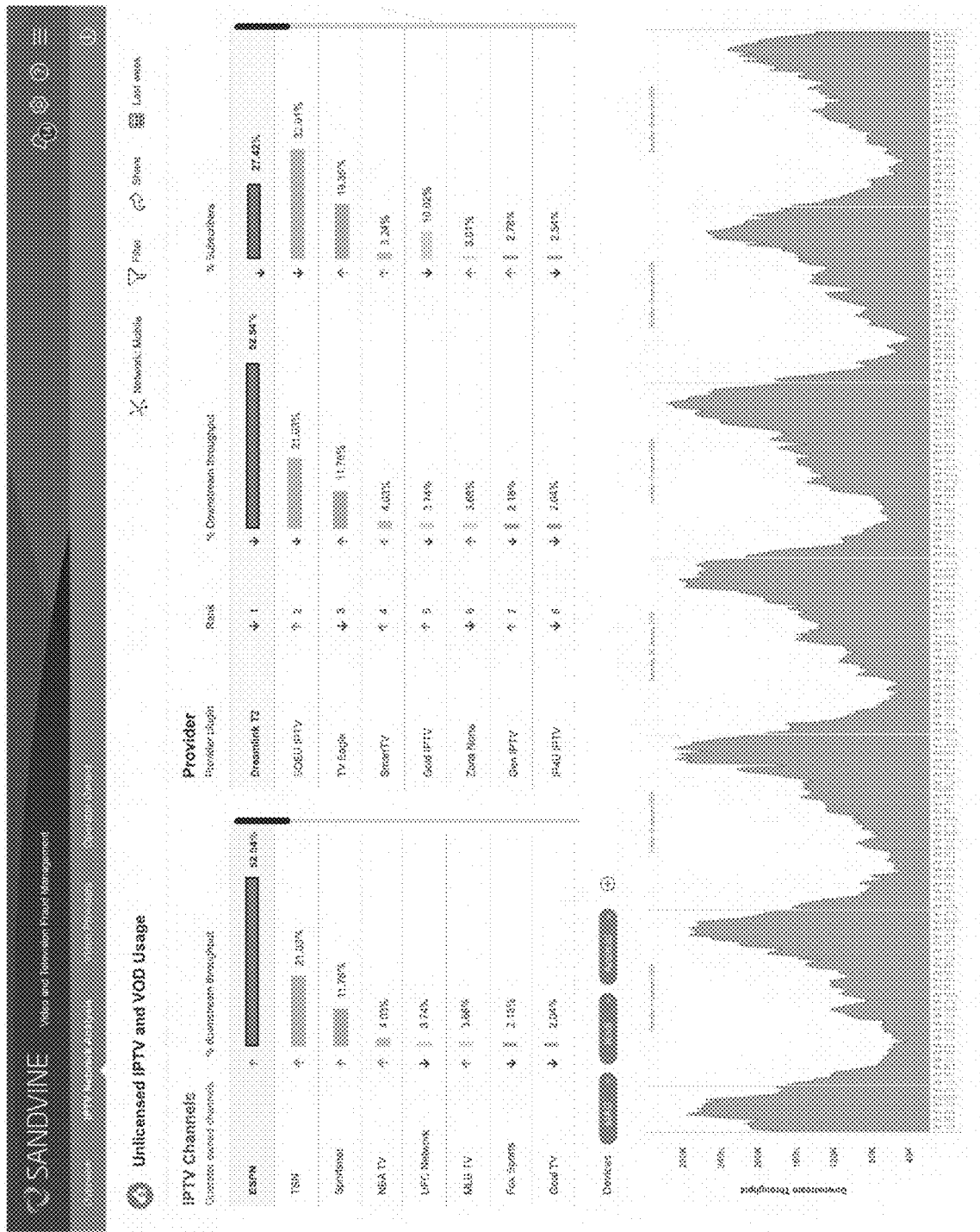

FIGS. 22 to 29 illustrate various phenomena visualizations for video services according to a specific example of the system for providing a network portal. FIG. 22 shows a specific example visualization of video QoE overview according to a specific use case. FIG. 23 shows a specific example visualization of video QoE according to location for a network operator. FIG. 24 illustrates a visualization showing potential churn for users of various video services. FIG. 25 illustrates an example visualization of intent based shaping for video services. FIG. 26 illustrates an example visualization of network optimization for video streaming management. FIG. 27 illustrates another example visualization of network optimization for video streaming management. FIG. 28 illustrates an example visualization of revenue generation with respect to video services. FIG. 29 illustrates an example visualization of revenue assurance and TV fraud management according to a use case.

Figure 30:
FIG. 30 illustrates a visualization showing network element health according to a specific example.

FIG. 30 illustrates a visualization for a specific example of a health of network elements of the network operator or network associated with the user. The visualization is intended to provide overall network health data as well as individual network element data. From here, it is intended the user is able to determine if there is a network policy that may be updated or another traffic action that may be implemented to improve the network conditions. In some cases, the traffic actions available to the user may be based on the analyzed network data and the user's role determined by the user module.

As can be seen from the figures, the visualizations may include bar graphs, heat maps, and the like or combinations of a plurality of visual representations.

Embodiments of the method may include providing a measurement for how the subscriber experience measures up to a strategic performance goal of the organization. A score for this metric may be represented as a color code numeric value within at least one dashboard of some or all use cases.

User categorization may be used to define the resource demand from a user's current pattern of activity. The labels indicate what kind of performance the network user type is most likely to expect from the operator. A high spike of light users can create a collective demand on the network that warrants action from the network through social sharing activities over holidays such as New Year's Eve. The launch of a new a new Video on Demand (VOD) services or cloud game can also introduce a spike of high volume users can create demand on the network. The network user type combined with their activity informs how the network should perform to provide good quality of experience. When an administrator sets a threshold, the system and method may actively manage resources in relations to the types of service being used and raise awareness in the content of the user persona viewing the information. For a network engineer persona, it may be that capacity is being rerouted to meet demand. For a customer support persona, it may be an indication of activity on the network that may result in an increase in support investigations.

Use cases may include a custom visualization design to display various metrics such as, throughput, latency, packet loss, and the like. By displaying these as a single set of metrics, the user can see each data point in relation to each other with a single action for fast decision making.

In some cases, intent visualizations may map the subscriber activity over the network optimization activity designed to meet the demand signaled by the subscriber intent on a timeline.

In the network traffic portal, use cases are generally accessed through the corresponding solution area menu. In some embodiments, licensed use cases may display in a particular color (e.g. black) to illustrate that they are available, while unlicensed use cases may display in a different color (e.g. grey) to indicate that they are not currently available. Selecting a licensed use case from the top menu will open the dashboard visualizations and workflow specific to the user role. On the other hand, selecting an unlicensed use case from the menu will show an example dashboard that demonstrates information that will help the end user determine if there would be value in making the changes needed to be able to use the selected unlicensed use case. For example, the demo dashboard may illustrate the return on investment (ROI) if the customer had that use case enabled on their network. In some cases, the user will be able to interact with the data that demonstrate the ROI of the use case but may not be able to access the features that enable it.

Examples of the information provided on the example dashboard may include:
What is the QoE for my subscriber activities?
How consistent is my QoE?
How much capacity can be saved with improved heavy user management
How is the network meeting the demand from Cloud Gamers on the network
How the demand on the network can be optimized with Fair Usage and capacity management to improve Quality of Experience for each network user type and service.
How much capacity can be saved to optimize CAPEX
The projected reduction in customer churn by early identification and better network management
How much malicious activity appears to be happening and its impact on the network
How much of the network activity is content video, gaming, social sharing and TV fraud-related
The projected reduction in truck rolls to a customer site based on additional monitoring or the like
Example insights to create value and increase revenue by offering innovative plans
Measurement of the network performance to determine if it is delivering on the brand or plan promise Once a new use case is licensed, the feature that manages resources, mitigate risk or offer insight to attract and retain customers; authorized roles will have access to the appropriate dashboards, visualization, and settings features. In some cases, the user may be offered the opportunity to purchase the required upgrade on-line through the network traffic portal itself or via redirection to an on-line store or the like.

In this description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether the embodiments described herein are implemented as a software routine, hardware circuit, firmware, or a combination thereof. Further, elements of an embodiment may be used with other embodiments and/or substituted with elements from another embodiment as would be understood by one of skill in the art.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

Applicants reserve the right to pursue any embodiments or sub-embodiments disclosed in this application; to claim any part, portion, element and/or combination thereof of the disclosed embodiments, including the right to disclaim any part, portion, element and/or combination thereof of the disclosed embodiments; or to replace any part, portion, element and/or combination thereof of the disclosed embodiments.

The above-described embodiments are intended to be examples only. Alterations, modifications and variations can be effected to the particular embodiments by those of skill in the art without departing from the scope, which is defined solely by the claims appended hereto.

We claim:

1. A method for providing a network portal, the method comprising:
   collecting network data for at least one network provider;
   analyzing the network data wherein, analyzing the network data comprises:
      determining a contextual situation for the analysis of the network data; and
      analyzing the data based on the contextual situation;
   determining a user role of a user accessing the network portal to review the network data, wherein the user role is based on corporation role;
   providing a user role visualization of the analyzed network data based on the user role of the user accessing the portal, wherein the user role visualization provides network performance based on the analyzed network data and adapts the information displayed depending on the corporate role and contextual situation;
   determining phenomena categories within the network based on identified global user activity; and
   updating visualizations based on network phenomena categories.

2. A method according to claim 1 wherein the network data comprises:
   network traffic flow data selected from the group comprising: Quality of Service data, composition of network traffic, services, Quality of Experience, and network congestion; and
   network subscriber data selected from the group comprising: subscriber device type, subscriber plan, and subscriber traffic flow.

3. A method according to claim 1 further comprising:
   determining network performance based on the analyzed network data; and
   providing a traffic action to the network based on the network performance.

4. A method according to claim 3 wherein the traffic action comprises reprioritizing at least some of the network traffic.

5. A method according to claim 3 wherein the traffic action comprises notifying at least one user of the network portal of the network performance.

6. A method according to claim 1 wherein at least some of the analyzed network data is hidden from a user based on the user's role.

7. A method according to claim 1 further comprising:
   presenting traffic actions available to the user based on the analyzed network data and the user's role.

8. A method according to claim 1 wherein the visualization provides the user an ability to view further levels of granularity with respect to the analyzed network data.

9. A method according to claim 1 wherein the visualization is customized by the user.

10. A system for providing a network portal, the system comprising at least one processor and a memory storing instructions that when executed by the at least one processor, cause the system to execute:
    a data collection module configured to collect network data for at least one network provider;
    an analysis module configured to analyze the network data and to provide network performance based on the analyzed network data, wherein, analyzing the network data comprises:
       determining a contextual situation for the analysis of the network data;
       analyzing the data based on the contextual situation;
       determining phenomena categories within the network based on identified global user activity; and
       updating the data based on network phenomena categories;
    a user module configured to determine a user role of a user accessing the network portal to review the network data, wherein the user role is based on corporation role; and
    a reporting module configured to provide a user role visualization of the analyzed network performance based on the user role and adapts the information displayed depending on the corporate role and the contextual situation.

11. A system according to claim 10 wherein the network data comprises:
    network traffic flow data selected from the group comprising: Quality of Service data, composition of network traffic, services, Quality of Experience, and network congestion; and
    network subscriber data selected from the group comprising: subscriber device type, subscriber plan, and subscriber traffic flow.

12. A system according to claim 10 wherein the analysis module is configured to determine network performance based on the analyzed network data; and
    a traffic action module is configured to provide a traffic action to the network based on the network performance.

13. A system according to claim 12 wherein the traffic action comprises reprioritizing at least some of the network traffic.

14. A system according to claim 12 wherein the traffic action comprises notifying at least one user of the network portal of the network performance.

15. A system according to claim 10 wherein at least some of the analyzed network data is hidden from a user based on the user's role.

16. A system according to claim 10 further comprising:
    a traffic action module configured to present traffic actions available to the user based on the analyzed network data and the user's role.

17. A system according to claim 10 wherein the visualization provides the user an ability to view further levels of granularity with respect to the analyzed network data.

18. A system according to claim 10 wherein the visualization is customized by the user.

19. A method according to claim 1 further comprising:
identifying network trends based on key network performance quality indicators; and
updating visualizations based on the network trends.

\* \* \* \* \*